US 10,981,475 B2

(12) United States Patent
Hotta et al.

(10) Patent No.: US 10,981,475 B2
(45) Date of Patent: Apr. 20, 2021

(54) SEAT AIR-CONDITIONING SYSTEM

(71) Applicant: DENSO CORPORATION, Kariya (JP)

(72) Inventors: Teruyuki Hotta, Kariya (JP); Tatsuhiro Suzuki, Kariya (JP); Shigeru Kawano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/692,693

(22) Filed: Nov. 22, 2019

(65) Prior Publication Data

US 2020/0086775 A1 Mar. 19, 2020

Related U.S. Application Data

(63) Continuation of application No. PCT/JP2018/018300, filed on May 11, 2018.

(30) Foreign Application Priority Data

Jun. 22, 2017 (JP) .............................. JP2017-122229

(51) Int. Cl.
*B60N 2/56* (2006.01)
*B60H 1/00* (2006.01)

(52) U.S. Cl.
CPC ....... *B60N 2/5642* (2013.01); *B60H 1/00285* (2013.01); *B60N 2/5678* (2013.01); *B60N 2/5692* (2013.01)

(58) Field of Classification Search
CPC .. B60N 2/5642; B60N 2/5678; B60N 2/5692; B60H 1/00285
See application file for complete search history.

(56) References Cited

U.S. PATENT DOCUMENTS

| 6,059,018 | A | 5/2000 | Yoshinori et al. | |
| 9,683,761 | B2* | 6/2017 | Itou | F25B 41/04 |
| 10,279,650 | B2* | 5/2019 | Maranville | B60H 1/00971 |
| 10,479,241 | B2* | 11/2019 | Filipkowski | B60N 2/22 |
| 10,603,976 | B2* | 3/2020 | Androulakis | B60N 2/56 |
| 10,625,566 | B2* | 4/2020 | Androulakis | B60H 1/00271 |
| 10,766,336 | B2* | 9/2020 | Fujii | B60H 1/00064 |

(Continued)

FOREIGN PATENT DOCUMENTS

| DE | 19830797 A1 | 1/1999 |
| DE | 102016100464 A1 | 7/2016 |

(Continued)

*Primary Examiner* — Philip F Gabler
(74) *Attorney, Agent, or Firm* — Harness, Dickey & Pierce, P.L.C.

(57) ABSTRACT

A seat air-conditioning system includes a plurality of seat air-conditioning devices respectively disposed for seats. Each of the seat air-conditioning devices achieves comfortable air conditioning in a vehicle interior by a controller controlling a refrigeration circuit, a blower, and a blowing switching portion in each seat air-conditioning device. A coordinating flow path is disposed to fluidly connect the blowing switching portion of one seat air-conditioning device to the blowing switching portion of the other seat air-conditioning device. The seat air-conditioning system performs the air conditioning for one seat by using the two seat air-conditioning devices by supplying conditioned air via the coordinating flow path under control of the controller.

13 Claims, 14 Drawing Sheets

(56) References Cited

U.S. PATENT DOCUMENTS

| | | | |
|---|---|---|---|
| 10,773,615 B2* | 9/2020 | McElroy | B60H 1/00564 |
| 2016/0207376 A1 | 7/2016 | Sawyer et al. | |
| 2019/0291614 A1* | 9/2019 | Kawano | B60N 2/5635 |
| 2019/0351735 A1* | 11/2019 | Kawano | B60H 1/00285 |
| 2020/0086774 A1* | 3/2020 | Muto | B60N 2/5635 |
| 2020/0215872 A1* | 7/2020 | Han | B60H 1/00842 |
| 2020/0391572 A1* | 12/2020 | Tsukagishi | B60H 1/00292 |

FOREIGN PATENT DOCUMENTS

| | | |
|---|---|---|
| JP | 200635952 A | 2/2006 |
| JP | 2006131106 A | 5/2006 |
| JP | 2006168681 A | 6/2006 |
| JP | 2016145015 A | 8/2016 |

* cited by examiner

SEAT AIR-CONDITIONING SYSTEM

CROSS REFERENCE TO RELATED APPLICATIONS

This application is a continuation application of international Patent Application No. PCT/JP2018/018300 filed on May 11, 2018, which designated the U.S. and claims the benefit of priority from Japanese Patent Application No. 2017-122229 filed on Jun. 22, 2017. The entire disclosure of all of the above applications are incorporated herein by reference.

TECHNICAL FIELD

The present disclosure relates to a seat air-conditioning system including seat air-conditioning devices that supply conditioned air to seats.

BACKGROUND ART

Various seat air-conditioning devices have been developed in order to provide an environment with a comfortable temperature for an occupant sitting in a seat. For example, a seat air-conditioning device is disposed between a seat face of a seat and a floor and includes a vapor compression refrigeration circuit in a housing. The seat air-conditioning device is formed to blow out conditioned air, at a temperature adjusted by an operation of the refrigeration circuit, toward an occupant sitting in the seat. The conditioned air in this case is warmed or cooled by means of heat exchange in a condenser or an evaporator forming the refrigeration circuit.

SUMMARY OF THE INVENTION

One aspect of the present disclosure is a seat air-conditioning system including: a plurality of seat air-conditioning devices that are disposed at a plurality of seats, respectively, in a vehicle interior, each of the plurality of seat air-conditioning devices supplying a conditioned air to a respective one of the plurality of seats; and a controller that is configured to control operations of the plurality of seat air-conditioning devices. Each of the seat air-conditioning devices includes: a blower; a refrigeration circuit that adjusts a temperature of blown air blown by the blower to produce the conditioned air; and a blowing switching portion that switches a supply destination for the conditioned air adjusted by the refrigeration circuit. The seat air-conditioning system further comprises a coordinating flow path that fluidly connects the blowing switching portion in one seat air-conditioning device for one seat to the blowing switching portion in another seat air-conditioning device for another seat. The controller is further configured to: switch the supply destination for the conditioned air at the blowing switching portion in the one seat air-conditioning device to the coordinating flow path; and supply the conditioned air that have flowed through the coordinating flow path to the other seat through the blowing switching portion in the other seat air-conditioning device.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
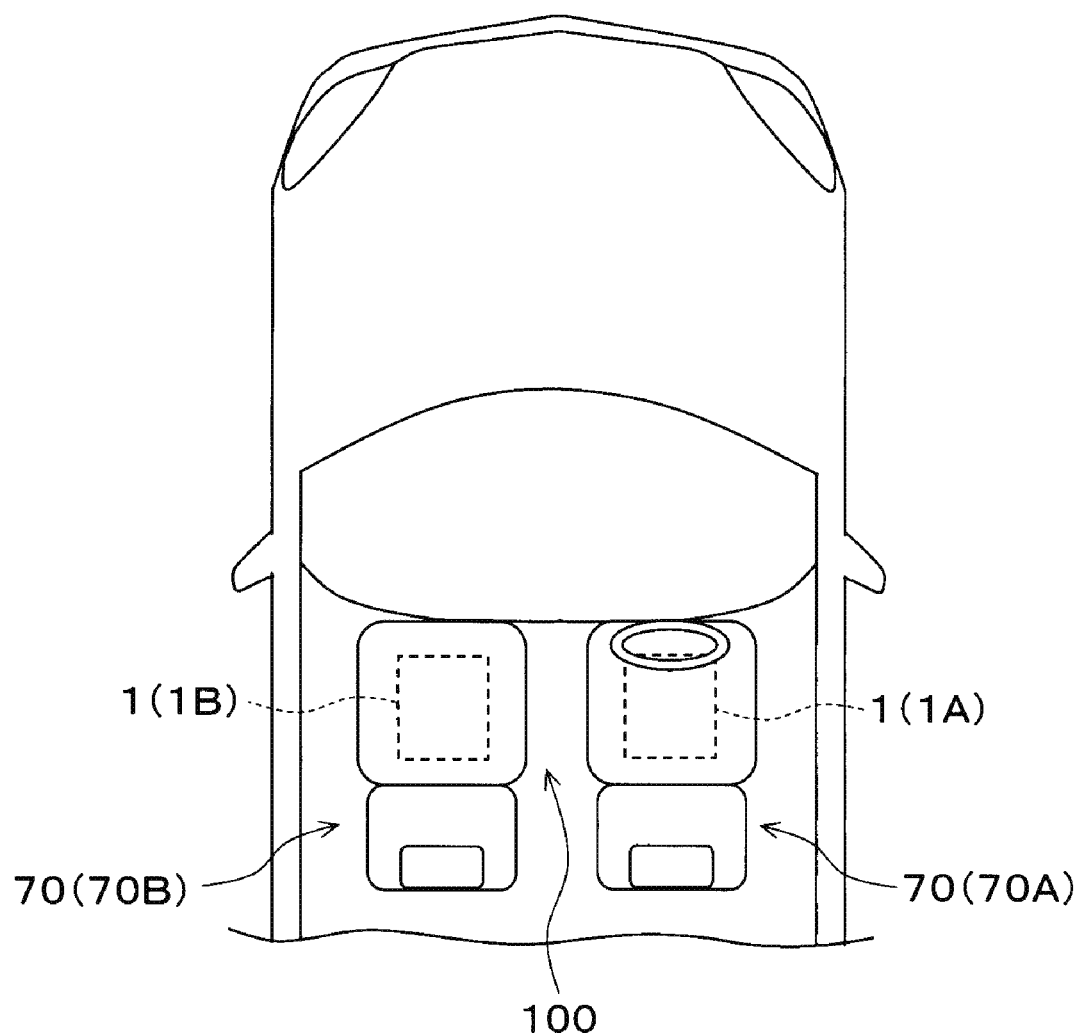
FIG. 1 is an explanatory view of a schematic structure of a seat air-conditioning system according to an embodiment.

Typically, a seat air-conditioning device is disposed for a seat for one person, and is capable of providing air conditioning adapted to the occupant sitting in the seat, thereby increasing comfort of the occupant. Therefore, it would be preferable to dispose the plurality of seat air-conditioning devices to deal with a situation such as a general passenger car accommodating a plurality of occupants.

However, the number of occupants in the vehicle is not always equal to a seating capacity of the vehicle and there may be unoccupied seats in a vehicle interior. In this case, some of the seat air-conditioning devices disposed at the respective seats are not fully utilized.

The present disclosure has been made with these points in view and its objective is to provide a seat air-conditioning system including a plurality of seat air-conditioning devices that can supply conditioned air to seats, wherein the seat air-conditioning system has enhanced air-conditioning performance for one seat through coordination between the respective seat air-conditioning devices.

According to one aspect of the present disclosure, a seat air-conditioning system includes: a plurality of seat air-conditioning devices that are disposed at a plurality of seats, respectively, in a vehicle interior, each of the plurality of seat air-conditioning devices supplying a conditioned air to a respective one of the plurality of seats; and a controller that is configured to control operations of the plurality of seat air-conditioning devices. Each of the seat air-conditioning devices includes: a blower; a refrigeration circuit that adjusts a temperature of blown air blown by the blower to produce the conditioned air; and a blowing switching portion that switches a supply destination for the conditioned air adjusted by the refrigeration circuit. The seat air-conditioning system further comprises a coordinating flow path that fluidly connects the blowing switching portion in one seat air-conditioning device for one seat to the blowing switching portion in another seat air-conditioning device for another seat. The controller is further configured to: switch the supply destination for the conditioned air at the blowing switching portion in the one seat air-conditioning device to the coordinating flow path; and supply the conditioned air that have flowed through the coordinating flow path to the other seat through the blowing switching portion in the other seat air-conditioning device.

According to the seat air-conditioning system, it is possible to achieve comfortable air conditioning adapted to each of the seats in the vehicle interior by controlling operations of the respective portions in the respective seat air-conditioning devices.

The coordinating flow path is disposed in the seat air-conditioning system and connects the blowing switching portion in the one seat air-conditioning device among the plurality of seat air-conditioning devices and the blowing switching portion in the other seat air-conditioning device. Therefore, according to the seat air-conditioning system, it is possible to supply the conditioned air between the one seat air-conditioning device and the other seat air-conditioning device via the coordinating flow path.

In other words, according to the seat air-conditioning system, it is possible to perform the air conditioning for the one or the other seat by using the one and the other seat air-conditioning devices, which enhances air-conditioning performance for an occupant sitting in the seat.

According to the seat air-conditioning system, the operations of the one and the other seat air-conditioning devices are performed individually and can be performed at different times and in different modes and therefore it is possible to achieve various kinds of air conditioning for the occupant sitting in the seat to thereby increase the comfort of the occupant.

According to another aspect of the present disclosure, a seat air-conditioning system includes: a plurality of seat air-conditioning devices that are disposed at a plurality of seats, respectively, in a vehicle interior, each of the plurality of seat air-conditioning devices supplying conditioned air to a respective one of the plurality of seats; and a controller that is configured to control operations of the plurality of seat air-conditioning devices. Each of the plurality of seat air-conditioning devices includes: a blower; a refrigeration circuit that adjusts a temperature of blown air blown by the blower to produce the conditioned air; and a blowing switching portion that switches a supply destination for the conditioned air adjusted by the refrigeration circuit. The seat air-conditioning system further comprises a coordinating flow path that fluidly connects the blowing switching portion in one seat air-conditioning device for one seat to the blowing switching portion in another seat air-conditioning device for another seat. The controller is further configured to: switch the supply destination for the conditioned air at the blowing switching portion in the one seat air-conditioning device to the coordinating flow path; and supply the conditioned air that has flowed through the coordinating flow path to a suction port of the blower in the other seat air-conditioning device through the blowing switching portion in the other seat air-conditioning device.

According to the seat air-conditioning system, it is possible to achieve comfortable air conditioning adapted to each of the seats in the vehicle interior by controlling operations of the respective portions in the respective seat air-conditioning devices.

The coordinating flow path is disposed in the seat air-conditioning system and connects the blowing switching portion in the one seat air-conditioning device out of the plurality of seat air-conditioning devices and the blowing switching portion in the other seat air-conditioning device. Therefore, according to the seat air-conditioning system, it is possible to supply the conditioned air between the one seat air-conditioning device and the other seat air-conditioning device via the coordinating flow path.

In other words, according to the seat air-conditioning system, it is possible to perform the air conditioning for the one or the other seat by using the one and the other seat air-conditioning devices, which enhances air-conditioning performance for an occupant sitting in the seat.

According to the seat air-conditioning system, it is possible to supply the conditioned air produced by the one seat air-conditioning device to the suction port of the blower in the other seat air-conditioning device via the coordinating flow path. In the seat air-conditioning device, the air supplied to the suction port is conditioned by the operations of the blower and the refrigeration circuit.

In other words, according to the seat air-conditioning system, it is possible to further adjust the temperature of the conditioned air produced by the one seat air-conditioning device with the refrigeration circuit of the other seat air-conditioning device, which enhances the air-conditioning performance for the occupant sitting in the seat.

According to the seat air-conditioning system, the operations of the one and the other seat air-conditioning devices are performed individually and can be performed in different modes and therefore it is possible to achieve various kinds of air conditioning for the occupant sitting in the seat to thereby increase the comfort of the occupant.

In view of the above, multiple embodiments for implementing the present disclosure will be described referring to drawings. In the respective embodiments, a part that corresponds to a matter described in a preceding embodiment may be assigned the same reference numeral, and redundant explanation for the part may be omitted.

A seat air-conditioning system 100 according to the present embodiment is applied to an electric car that travels by using power of a battery. As shown in FIG. 1, a plurality of seats 70 for seating occupants is disposed in a vehicle interior of the electric car. The plurality of seats 70 includes a seat 70A and a seat 70B.

The seat 70A is the seat 70 disposed to face a steering wheel of the electric car and corresponding to a driver's seat. The seat 70B is the seat 70 disposed beside the driver's seat and corresponding to a passenger's seat.

Figure 2:
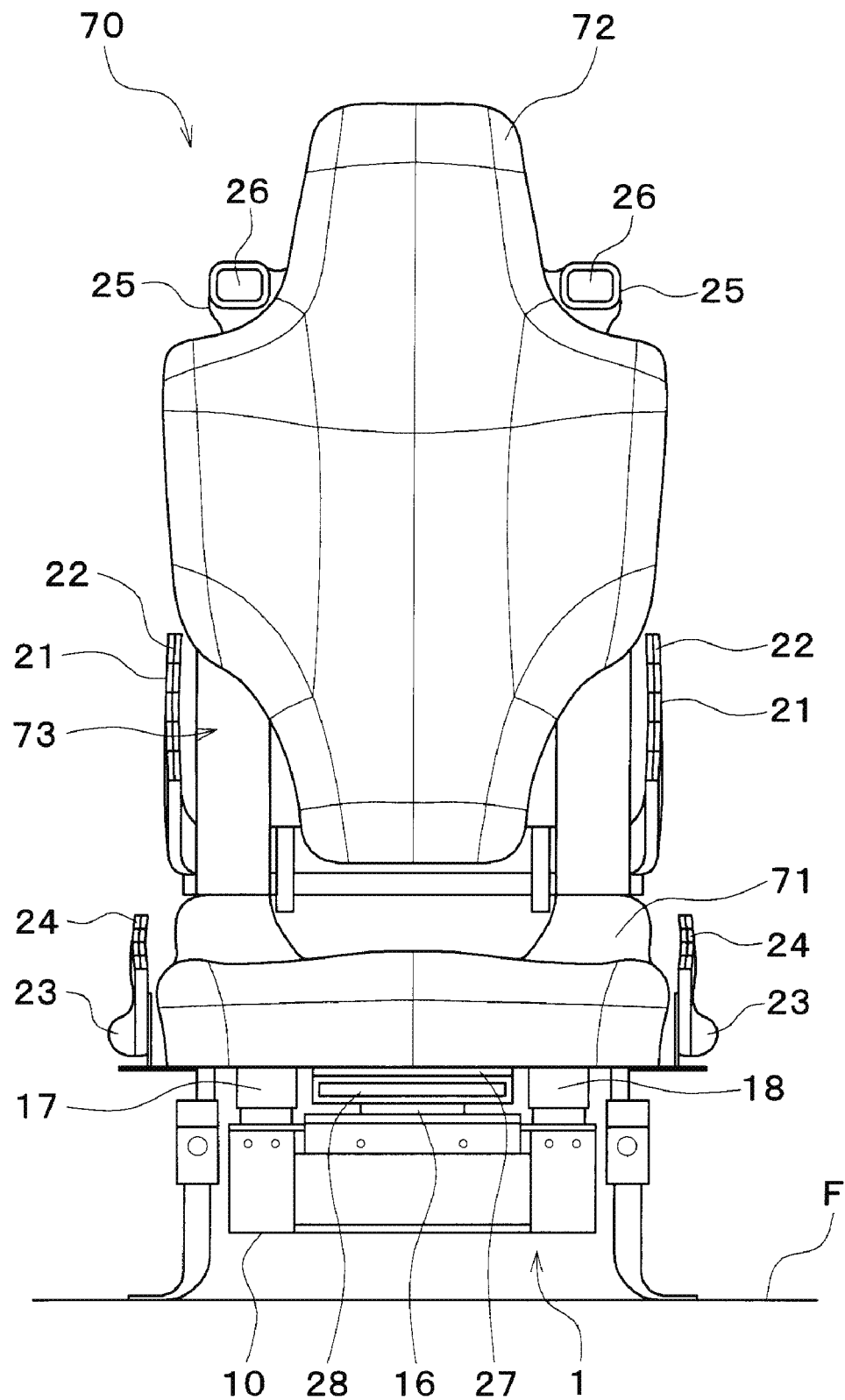
FIG. 2 is a front view of the seat air-conditioning device according to the embodiment.
Figure 3:
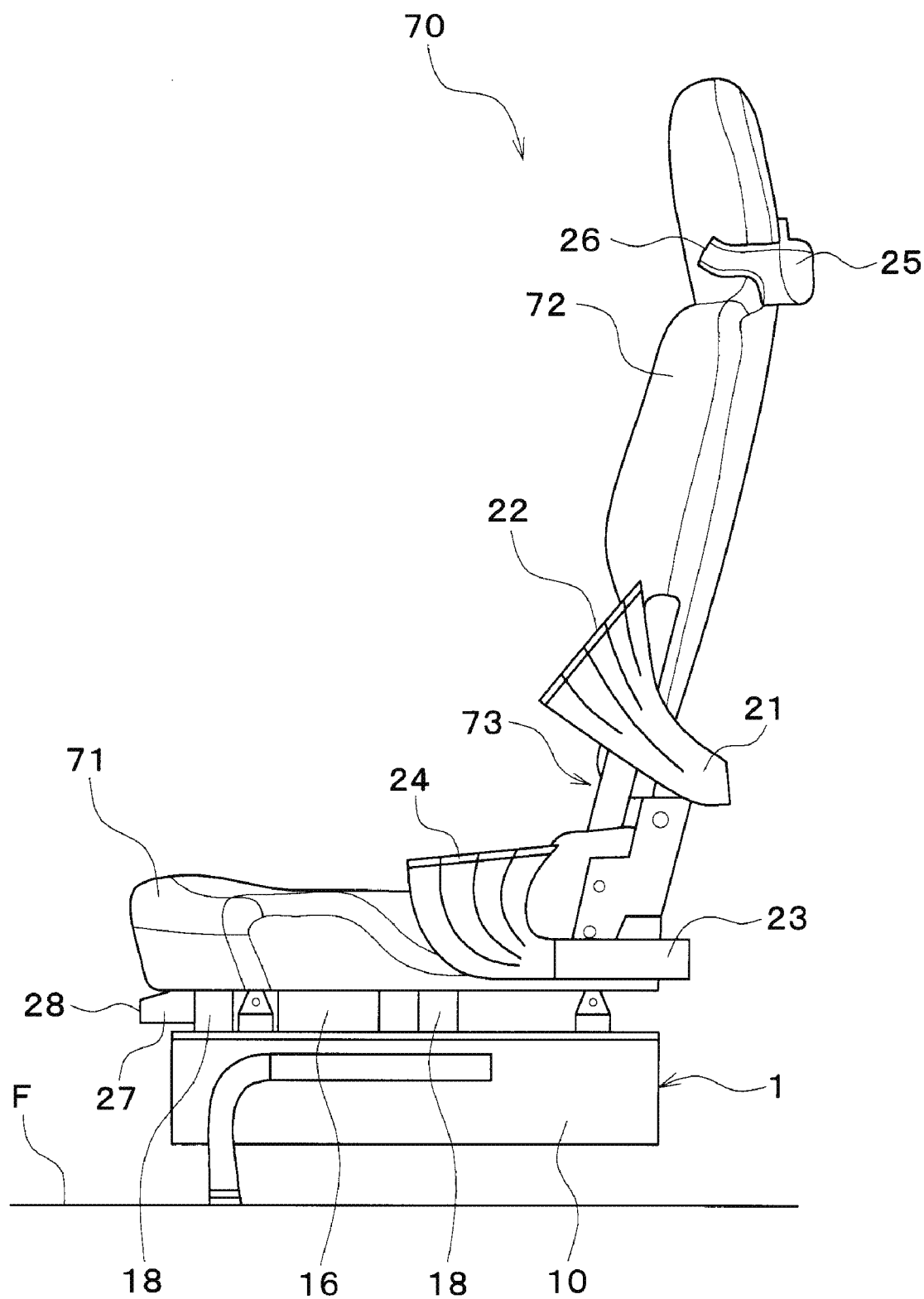
FIG. 3 is a side view of the seat air-conditioning device according to the embodiment.

As shown in FIGS. 2 and 3, each of the seats 70 has a seat face 71, a backrest 72, and a seat frame 73. The seat face 71 is a portion, on which the occupant sits, and has a porous cushion on its upper face.

The backrest 72 forms a portion that supports the occupant sitting on the seat face 71 from behind and has a porous cushion on its front face. The seat frame 73 is formed by assembling metal pipes and functions as a skeletal portion of the seat 70. The seat 70 is formed by fixing relative positions of the seat face 71 and the backrest 72 by use of the seat frame 73.

In the present embodiment, a seat air-conditioning device 1 is disposed at each of the seats 70. As shown in FIGS. 2 to 5, each of the seat air-conditioning devices 1 includes a vapor compression refrigeration circuit 2 and a blower 7 housed in a housing 10 disposed in a small space between the seat face 71 of the seat 70 and a vehicle interior floor F of the electric car.

Therefore, the seat air-conditioning device 1 can adjust a temperatures of blown air blown by an operation of the blower 7 with the refrigeration circuit 2 and supply the blown air to the occupant sitting in the seat 70 as conditioned air through blowing ducts such as main ducts 21.

Here, the seat air-conditioning system 100 according to the present embodiment includes the plurality of seat air-conditioning devices 1 and a control unit, or a controller, 60 that controls operations of the seat air-conditioning devices 1 and effectively increases comfort of the occupant by bringing the plurality of seat air-conditioning devices 1 into operation in a coordinated fashion.

In the following description, in order to describe a coordination control of the plurality of seats 70, the seat air-conditioning system 100 capable of performing the coordination control of the seat air-conditioning device 1 disposed at the seat 70A that is the driver's seat and the seat air-conditioning device 1 disposed at the seat 70B that is the passenger's seat will be described. The seat air-conditioning device 1 disposed at the seat 70A will be referred to as the seat air-conditioning device 1A and the seat air-conditioning device 1 disposed at the seat 70B will be referred to as the seat air-conditioning device 1B.

Next, a schematic structure of each of the seat air-conditioning devices 1 forming the seat air-conditioning system 100 according to the present embodiment will be described with reference to FIGS. 2 to 5. In the following description and FIGS. 2 to 5, the seat air-conditioning device 1 that is a generic term for the seat air-conditioning device 1A and the seat air-conditioning device 1B will be described.

As shown in FIGS. 2 to 5, the seat air-conditioning device 1 includes the refrigeration circuit 2 and the blower 7 housed in the housing 10 formed as a box that can be disposed between the seat face 71 and the vehicle interior floor F.

The refrigeration circuit 2 forms the vapor compression refrigeration circuit and performs a function of cooling or heating the blown air blown to an area including the seat 70 in the vehicle interior that is a space to be air-conditioned. The refrigeration circuit 2 includes a compressor 3, a condenser 4, an expansion valve 5, and an evaporator 6.

Here, the refrigeration circuit 2A refers to the refrigeration circuit 2 in the seat air-conditioning device 1A and the refrigeration circuit 2B refers to the refrigeration circuit 2 in the seat air-conditioning device 1B.

HFC refrigerant (specifically, R134a) is employed as refrigerant in the refrigeration circuit 2 and the refrigeration circuit 2 forms a vapor compression subcritical refrigeration circuit in which a refrigerant pressure on a high-pressure side does not exceed a critical pressure of the refrigerant. It is of course possible to employ HFO refrigerant (e.g., R1234yf), natural refrigerant (e.g., R744), or the like as the refrigerant. Moreover, refrigerant oil for lubricating the compressor 3 is mixed into the refrigerant and part of the refrigerant oil circulates through the cycle together with the refrigerant.

Figure 4:
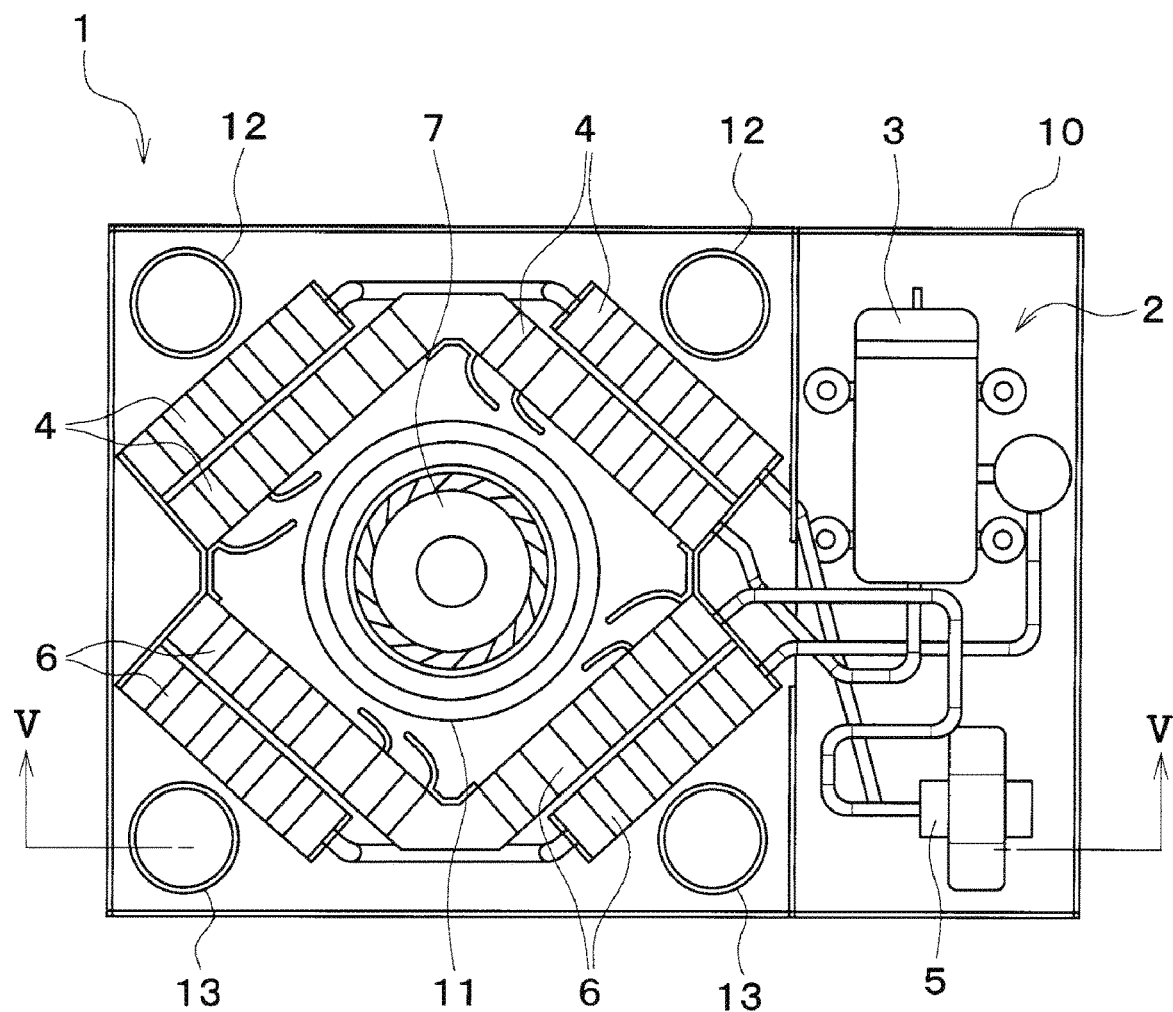
FIG. 4 is a plan view of an internal structure of the seat air-conditioning device according to the embodiment.

As shown in FIG. 4, the blower 7 is disposed at a central portion in the housing 10 in the seat air-conditioning device 1. The blower 7 is an electric blower including a centrifugal multi-blade fan driven by an electric motor. The blower 7 is disposed with a rotating shaft of the centrifugal multi-blade fan oriented in a vertical direction of the housing 10.

Therefore, the blower 7 draws in air along the vertical direction of the housing 10 and blows the drawn air in a centrifugal direction orthogonal to the shaft. Rotation speed (a blown air volume) of the centrifugal multi-blade fan in the blower 7 is controlled by a control voltage output from an individual controller 50 (described later).

Figure 6:
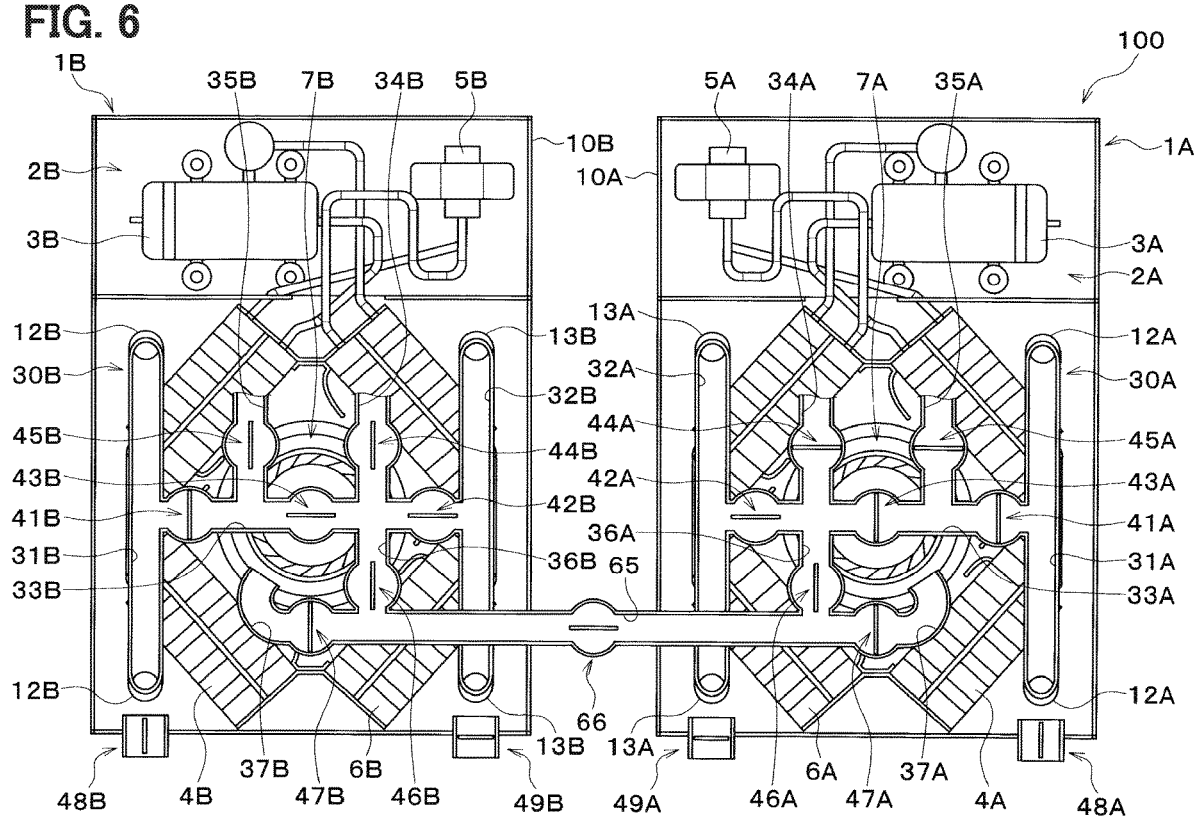
FIG. 6 is an explanatory view of structures of blowing switching portions in the seat air-conditioning system according to the embodiment.

As shown in FIG. 6, the blower 7A refers to the blower 7 of the seat air-conditioning device 1A and the blower 7B refers to the blower 7 of the seat air-conditioning device 1B.

The compressor 3 draws in, compresses, and discharges the refrigerant in the refrigeration circuit 2. The compressor 3 is disposed in the housing 10 of the seat air-conditioning device 1. The compressor 3 is formed as an electric compressor including a fixed discharge capacity compression mechanism that has a fixed capacity and is driven by an electric motor.

Here, the compressor 3A refers to the compressor 3 of the seat air-conditioning device 1A and the compressor 3B refers to the compressor 3 of the seat air-conditioning device 1B.

As the compression mechanism of the compressor 3, various compression mechanisms such as a scroll compression mechanism and a vane compression mechanism can be employed. An operation (a rotation speed) of the electric motor forming the compressor 3 is controlled by control signals output from the individual controller 50 (described later). As the electric motor, either one of an AC motor and a DC motor can be employed. The individual controller 50 controls the rotation speed of the electric motor to thereby change refrigerant discharge performance of the compression mechanism.

A refrigerant inlet of the condenser 4 is connected to a discharge port of the compressor 3. As shown in FIG. 4, the condenser 4 is formed by connecting a plurality of heat exchangers, disposed to surround the blower 7 by about 180°, with refrigerant pipes in the housing 10.

Therefore, the condenser 4 can cause the high-temperature and high-pressure discharged refrigerant discharged from the compressor 3 and the blown air blown by the blower 7 to exchange heat with each other to thereby heat the blown air. Here, the condenser 4A refers to the condenser 4 of the seat air-conditioning device 1A and the condenser 4B refers to the condenser 4 of the seat air-conditioning device 1B.

The expansion valve 5 is disposed on a side of a refrigerant outlet of condenser 4. The expansion valve 5 is formed to be able to change a throttle opening of a refrigerant flow path and reduces a pressure of the refrigerant flowing out of the condenser 4. As shown in FIG. 6, the expansion valve 5A refers to the expansion valve 5 of the seat air-conditioning device 1A and the expansion valve 5B refers to the expansion valve 5 of the seat air-conditioning device 1B.

Although the expansion valve 5 is used as a pressure reducer according to the present embodiment, the pressure reducer is not restricted to the expansion valve 5. Various structures can be used as the pressure reducer if the pressure reducer can reduce the pressure of the refrigerant flowing out of the condenser 4. For example, a fixed throttle or a capillary tube may be employed as an example of the pressure reducer in the present disclosure or an expansion valve with a throttle opening controllable by control signals from the individual controller 50 may be used.

A refrigerant inlet of the evaporator 6 is connected to an outlet of the expansion valve 5. As shown in FIG. 4, the evaporator 6 is formed by connecting a plurality of heat exchangers, disposed to surround the blower 7 by about 180°, with refrigerant pipes in the housing 10. In other words, as shown in FIG. 4, the blower 7 is surrounded with the condenser 4 and the evaporator 6.

The evaporator 6 can cause the refrigerant flowing out of the expansion valve 5 and the blown air blown by the blower 7 to exchange heat with each other to thereby cool the blown air. As shown in FIG. 6, the evaporator 6A refers to the evaporator 6 of the seat air-conditioning device 1A and the evaporator 6B refers to the evaporator 6 of the seat air-conditioning device 1B.

The housing 10 is formed in a box shape of such a size that the housing 10 can be disposed between the seat face 71 of the seat 70 and the vehicle interior floor F and has a suction port 11, a plurality of warm air blow outlets 12, and a plurality of cold air blow outlets 13 in its upper face. Here, the housing 10A refers to the housing 10 of the seat air-conditioning device 1A and the housing 10B refers to the housing 10 of the seat air-conditioning device 1B.

Figure 5:
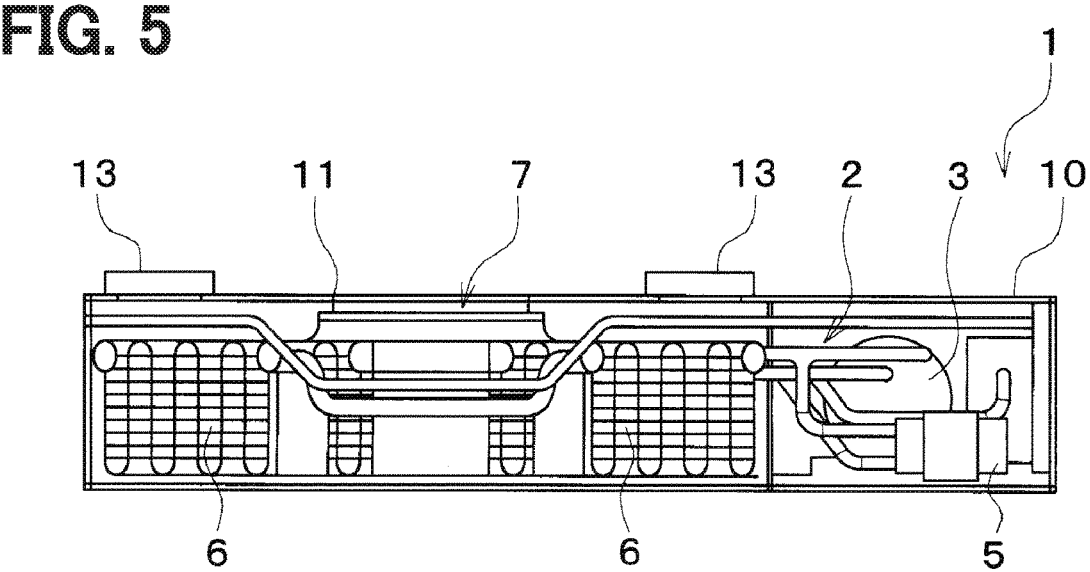
FIG. 5 is a sectional view of the internal structure of the seat air-conditioning device according to the embodiment.

As shown in FIGS. 4 and 5, the suction port 11 is formed at a central portion of the upper face of the housing 10. An opening of the suction port 11 covers an area directly above the rotating shaft of the centrifugal multi-blade fan of the blower 7 and connects an inside and an outside of the housing 10.

Therefore, the blower 7 can draw air in the vehicle interior into the housing 10 through the suction port 11 when the blower 7 operates. The suction port 11A refers to the suction port 11 of the seat air-conditioning device 1A and the suction port 11B refers to the suction port 11 of the seat air-conditioning device 1B.

The warm air blow outlets 12 are open in two corners on a side of the condenser 4 out of corners of the upper face of the housing 10 and connect the inside and the outside of the housing 10. A part of the blown air from the blower 7 is warmed by the heat exchange in the condenser 4 and then blown out of the warm air blow outlets 12. The warm air blow outlets 12A refer to the warm air blow outlets 12 of the seat air-conditioning device 1A and the warm air blow outlets 12B refer to the warm air blow outlets 12 of the seat air-conditioning device 1B.

On the other hand, the cold air blow outlets 13 are open in two corners on a side of the evaporator 6 out of the corners of the upper face of the housing 10 and connect the inside and the outside of the housing 10. The other part of the blown air from the blower 7 is cooled by the heat exchange in the evaporator 6 and then blown out of the cold air blow outlets 13. As shown in FIG. 6, the cold air blow outlets 13A refer to the cold air blow outlets 13 of the seat air-conditioning device 1A and the cold air blow outlets 13B refer to the cold air blow outlets 13 of the seat air-conditioning device 1B.

As shown in FIGS. 2 and 3, a central connecting member 16 is mounted to the suction port 11. The central connecting member 16 is formed in a hollow shape and connected to a blowing switching portion 30 disposed in the seat face 71 of the seat 70.

Warm-air-side connecting members 17 each having a hollow shape are mounted to the warm air blow outlets 12 and cold-air-side connecting members 18 each having a hollow shape are mounted to the cold air blow outlets 13. The warm-air-side connecting members 17 and the cold-air-side connecting members 18 are respectively connected to the blowing switching portion 30 (described later) and connected to the blowing ducts including main ducts 21 (described later) and the like with the blowing switching portion 30 interposed therebetween. This point will be described later with reference to the drawings.

Therefore, the seat air-conditioning device 1 according to the present embodiment can supply the conditioned air adjusted by the refrigeration circuit 2 to the occupant sitting in the seat 70 through the respective blowing ducts such as the main ducts 21.

As shown in FIGS. 2 and 3, the pair of main ducts 21, a pair of leg ducts 23, and a pair of upper ducts 25 are disposed on opposite side faces of each of the seats 70. A lower duct 27 is disposed below the seat face 71 of each of the seats 70.

Each of the paired main ducts 21 is formed in the flat hollow shape and extends from the blowing switching portion 30 disposed in the seat face 71 of the seat 70 to a height of a middle portion of the backrest 72 along the side face of the seat 70.

One end of each of the main ducts 21 is positioned at the same height as the middle portion of the backrest 72 and has a main blow outlet 22. The main blow outlet 22 communicates with an inside of the main duct 21 and curves slightly inward in a width direction of the seat 70. The other ends of the main ducts 21 are connected to the warm air blow outlets 12 and the cold air blow outlets 13 with the blowing switching portion 30 interposed therebetween.

Therefore, warm air W or cold air C as the conditioned air adjusted by the seat air-conditioning device 1 is supplied to the occupant sitting in the seat 70 through the main blow outlets 22. Because the main blow outlets 22 curve slightly inward in the width direction at the height of the middle portion of the backrest 72, the seat air-conditioning device 1 can more efficiently supply the conditioned air to a trunk of the occupant sitting in the seat 70.

Here, the main ducts 21A refer to the main ducts 21 at the seat 70A and the main ducts 21B refer to the main ducts 21 at the seat 70B.

The paired leg ducts 23 are formed in hollow shapes, extend along the seat face 71 of the seat 70, and then curve upward. One end of each of the leg ducts 23 is positioned slightly above the upper face of the seat face 71 and has a leg blow outlet 24. The leg blow outlet 24 is formed to curve slightly inward in a vehicle width direction. On the other hand, the other ends of the leg ducts 23 are connected to the warm air blow outlets 12 and the cold air blow outlets 13 with the blowing switching portion 30 interposed therebetween.

Therefore, the warm air W or the cold air C adjusted by the seat air-conditioning device 1 is supplied to the legs of the occupant sitting in the seat 70 through the leg blow outlets 24. Because the leg blow outlets 24 curve slightly inward in the width direction at positions slightly above the upper face of the seat face 71, the seat air-conditioning device 1 can more efficiently supply the conditioned air to the legs such as thighs of the occupant sitting in the seat 70.

The leg ducts 23A refer to the leg ducts 23 at the seat 70A and the leg ducts 23B refer to the leg ducts 23 at the seat 70B.

The paired upper ducts 25 are formed in hollow shapes extending upward along the backrest 72 and bend forward at an upper portion of the backrest 72. One end of each of the upper ducts 25 is positioned at the upper portion of the backrest 72 and has an upper blow outlet 26 open forward. The other ends of the upper ducts 25 are connected to the warm air blow outlets 12 and the cold air blow outlets 13 with the blowing switching portion 30 interposed therebetween.

Therefore, the warm air W or the cold air C adjusted by the seat air-conditioning device 1 is supplied to an area including the head of the occupant sitting in the seat 70 through the upper blow outlets 26. In other words, each of the upper blow outlets 26 may function as an example of an upper blow outlet in the present disclosure.

The upper ducts 25A refer to the upper ducts 25 at the seat 70A and the upper ducts 25B refer to the upper ducts 25 at the seat 70B.

The lower duct 27 having a hollow shape is disposed on a front side of the seat face 71 of each of the seats 70 and connected to the blowing switching portion 30. As shown in FIGS. 1 and 2, the lower duct 27 is positioned at a center portion in a width direction of the seat face 71 and disposed between the warm-air-side connecting member 17 and the cold-air-side connecting member 18 positioned on the front side.

A lower blow outlet 28 is formed in a front face of the lower duct 27 and connects an inside and an outside of the lower duct 27. The other end of the lower duct 27 is connected to the warm air blow outlets 12 and the cold air blow outlets 13 with the blowing switching portion 30 interposed therebetween similarly to the main ducts 21 and the like.

Therefore, the warm air W or the cold air C adjusted by the seat air-conditioning device 1 is supplied to an area around feet of the occupant sitting in the seat 70 through the lower blow outlet 28. In other words, the lower blow outlet 28 may function as an example of a lower blow outlet in the present disclosure.

The lower duct 27A refers to the lower duct 27 at the seat 70A and the lower duct 27B refers to the lower duct 27 at the seat 70B.

Next, a schematic structure of the blowing switching portion 30 in each of the seat air-conditioning devices 1 will be described in detail with reference to FIG. 6. As described above, the blowing switching portion 30 is disposed in the seat face 71 of the seat 70 and includes a plurality of flow paths through which the conditioned air flowing out of the warm air blow outlets 12 and the like flows and a supply destination switching mechanism 40 for switching a supply destination for the conditioned air flowing through the flow paths.

The blowing switching portion 30A refers to the blowing switching portion 30 of the seat air-conditioning device 1A and the blowing switching portion 30B refers to the blowing switching portion 30 of the seat air-conditioning device 1B. Similarly, the supply destination switching mechanism 40A refers to the supply destination switching mechanism 40 of the seat air-conditioning device 1A and the supply destination switching mechanism 40B refers to the supply destination switching mechanism 40 of the seat air-conditioning device 1B.

As shown in FIG. 6, the plurality of flow paths in each of the blowing switching portions 30 include a warm air supply flow path 31, a cold air supply flow path 32, a main flow path 33, an upper blowing flow path 34, a main blowing flow path 35, a connecting flow path 36, and a suction port supply flow path 37.

The warm air supply flow path 31 is a pipe-shaped flow path connected to the two warm air blow outlets 12 located in the upper face of the housing 10 in the seat air-conditioning device 1. Therefore, in the seat air-conditioning device 1, the warm air W blown out of the respective warm air blow outlets 12 flows through the warm air supply flow path 31 and is supplied to a predetermined supply destination.

As shown in FIG. 6, the warm air supply flow path 31A refers to the warm air supply flow path 31 in the seat air-conditioning device 1A and the warm air supply flow path 31B refers to the warm air supply flow path 31 in the seat air-conditioning device 1B.

The cold air supply flow path 32 is a pipe-shaped flow path connected to the two cold air blow outlets 13 located in the upper face of the housing 10 in the seat air-conditioning device 1 and extends parallel to the warm air supply flow path 31. Therefore, in the seat air-conditioning device 1, the cold air C blown out of the respective cold air blow outlets 13 flows through the cold air supply flow path 32 and is supplied to a predetermined supply destination.

The cold air supply flow path 32A refers to the cold air supply flow path 32 in the seat air-conditioning device 1A and the cold air supply flow path 32B refers to the cold air supply flow path 32 in the seat air-conditioning device 1B.

The main flow path 33 is a pipe-shaped flow path connected to the warm air supply flow path 31 and the cold air supply flow path 32. One end of the main flow path 33 is connected to the warm air supply flow path 31 and the other end of the main flow path 33 is connected to the cold air supply flow path 32. Therefore, the warm air W after flowing through the warm air supply flow path 31 and the cold air C after flowing through the cold air supply flow path 32 flow through the main flow path 33.

As shown in FIG. 6, the main flow path 33A refers to the main flow path 33 in the seat air-conditioning device 1A and the main flow path 33B refers to the main flow path 33 in the seat air-conditioning device 1B.

The upper blowing flow path 34 is a pipe-shaped flow path for connecting the main flow path 33 and the paired upper ducts 25. One end of the upper blowing flow path 34 is connected to the main flow path 33 and the other end of the upper blowing flow path 34 is connected to the paired upper ducts 25. Therefore, the seat air-conditioning device 1 can supply the conditioned air after flowing through the main flow path 33 from the upper blow outlets 26 of the paired upper ducts 25 via the upper blowing flow path 34.

The upper blowing flow path 34A refers to the upper blowing flow path 34 in the seat air-conditioning device 1A and the upper blowing flow path 34B refers to the upper blowing flow path 34 in the seat air-conditioning device 1B.

The main blowing flow path 35 is a pipe-shaped flow path for connecting the paired main ducts 21, the paired leg ducts 23, and the lower duct 27 to the main flow path 33. One end of the main blowing flow path 35 is connected to the main flow path 33 and the other end of the main blowing flow path 35 is connected to the paired main ducts 21, the paired leg ducts 23, and the lower duct 27.

Therefore, the seat air-conditioning device 1 can supply the conditioned air after flowing through the main flow path 33 from the main blow outlets 22 of the main ducts 21, the leg blow outlets 24 of the leg ducts 23, and the lower blow outlet 28 of the lower duct 27 via the main blowing flow path 35.

Here, the main blowing flow path 35A refers to the main blowing flow path 35 in the seat air-conditioning device 1A and the main blowing flow path 35B refers to the main blowing flow path 35 in the seat air-conditioning device 1B.

The connecting flow path 36 is a pipe-shaped flow path for connecting the suction port supply flow path 37 and a coordinating flow path 65 (described later) to the main flow path 33. One end of the connecting flow path 36 is connected to the main flow path 33 and the other end of the connecting flow path 36 is connected to the suction port supply flow path 37 and the coordinating flow path 65.

As shown in FIG. 6, the connecting flow path 36A refers to the connecting flow path 36 in the seat air-conditioning device 1A and the connecting flow path 36B refers to the connecting flow path 36 in the seat air-conditioning device 1B.

The suction port supply flow path 37 is a pipe-shaped flow path for leading the conditioned air, flowing into the suction port supply flow path 37, to the suction port 11 in the seat air-conditioning device 1. One end of the suction port supply flow path 37 is connected to the connecting flow path 36 and the coordinating flow path 65 and the other end of the suction port supply flow path 37 is disposed at an opening edge of the central connecting member 16 mounted to the suction port 11 of the seat air-conditioning device 1.

Therefore, the seat air-conditioning device 1 can supply the conditioned air after flowing into the suction port supply flow path 37 to the suction port 11 and adjust the temperature of the conditioned air drawn in from the suction port 11 by use of the refrigeration circuit 2.

The suction port supply flow path 37A refers to the suction port supply flow path 37 in the seat air-conditioning device 1A and the suction port supply flow path 37B refers to the suction port supply flow path 37 in the seat air-conditioning device 1B.

Next, a schematic structure of the supply destination switching mechanism 40 in the blowing switching portion 30 will be described with reference to FIG. 6. The supply destination switching mechanism 40A refers to the supply destination switching mechanism 40 in the blowing switching portion 30A and the supply destination switching mechanism 40B refers to the supply destination switching mechanism 40 in the blowing switching portion 30B.

The supply destination switching mechanism 40 is a mechanism for switching the flow of conditioned air in the flow paths from the warm air supply flow path 31 to the suction port supply flow path 37 and includes a switching portion 41, a switching portion 42, a switching portion 43, a switching portion 44, a switching portion 45, a switching portion 46, and a switching portion 47.

The switching portion 41 is disposed at a connected portion of the warm air supply flow path 31 and the main flow path 33 and includes a door member that can open and close insides of the flow paths and a servomotor that turns the door member. The switching portion 41 can switch between allowing and not allowing the conditioned air to flow out of the warm air supply flow path 31 by opening and closing the flow paths with the door member.

As shown in FIG. 6, the switching portion 41A refers to the switching portion 41 in the supply destination switching mechanism 40A and the switching portion 41B refers to the switching portion 41 in the supply destination switching mechanism 40B.

The switching portion 42 is disposed at a connected portion of the cold air supply flow path 32 and the main flow path 33 and includes a door member that can open and close insides of the flow paths and a servomotor that turns the door member. The switching portion 42 can switch between allowing and not allowing the conditioned air to flow out of the cold air supply flow path 32 by opening and closing the flow paths with the door member.

The switching portion 42A refers to the switching portion 42 in the supply destination switching mechanism 40A and the switching portion 42B refers to the switching portion 42 in the supply destination switching mechanism 40B.

The switching portion 43 is disposed between a connected portion to the upper blowing flow path 34 and a connected portion to the main blowing flow path 35 in the main flow path 33. The switching portion 43 includes a door member that can open and close an inside of the flow path and a servomotor that turns the door member.

The switching portion 43 can switch between flowing and not flowing of the conditioned air between a side of the upper blowing flow path 34 and a side of the main blowing flow path 35 in the main flow path 33 by opening and closing the flow path with the door member. As shown in FIG. 6, the switching portion 43A refers to the switching portion 43 of the supply destination switching mechanism 40A and the switching portion 43B refers to the switching portion 43 of the supply destination switching mechanism 40B.

The switching portion 44 is disposed in the upper blowing flow path 34 and includes a door member that can open and close an inside of the flow path and a servomotor that turns the door member. The switching portion 44 can switch between allowing and not allowing the conditioned air to flow from the main flow path 33 toward the paired upper ducts 25 by opening and closing the flow path with the door member. The switching portion 44A refers to the switching portion 44 in the supply destination switching mechanism 40A and the switching portion 44B refers to the switching portion 44 in the supply destination switching mechanism 40B.

The switching portion 45 is disposed in the main blowing flow path 35 and includes a door member that can open and close an inside of the flow path and a servomotor that turns the door member. The switching portion 45 can switch between allowing and not allowing the conditioned air to flow from the main flow path 33 toward connected portions to the main ducts 21 and the like by opening and closing the flow path with the door member.

The switching portion 45A refers to the switching portion 45 in the supply destination switching mechanism 40A and the switching portion 45B refers to the switching portion 45 in the supply destination switching mechanism 40B.

The switching portion 46 is disposed in the connecting flow path 36 and includes a door member that can open and close an inside of the flow path and a servomotor that turns the door member. The switching portion 46 can switch between allowing and not allowing the conditioned air to flow out of the connecting flow path 36 by opening and closing the flow path with the door member.

As shown in FIG. 6, the switching portion 46A refers to the switching portion 46 in the supply destination switching mechanism 40A and the switching portion 46B refers to the switching portion 46 in the supply destination switching mechanism 40B.

The switching portion 47 is disposed in the suction port supply flow path 37 and includes a door member that can open and close an inside of the flow path and a servomotor that turns the door member. The switching portion 47 can switch between allowing and not allowing the conditioned air to flow into the suction port 11 of the seat air-conditioning device 1 by opening and closing the flow path with the door member.

The switching portion 47A refers to the switching portion 47 in the supply destination switching mechanism 40A and the switching portion 47B refers to the switching portion 47 in the supply destination switching mechanism 40B.

In this way, in the seat air-conditioning device 1, it is possible to suitably switch between supply destinations of the conditioned air by individually controlling operations of the switching portions 41 to 47. Concrete switching modes will be described later with reference to the drawings.

As shown in FIG. 6, a warm air exhausting portion 48 and a cold air exhausting portion 49 are located in a side face of the housing 10 in each of the seat air-conditioning devices 1. The warm air exhausting portion 48 is located in the side face of the housing 10 positioned near the condenser 4 and the warm air blow outlet 12 and connects the inside and the outside of the housing 10.

The warm air exhausting portion 48 includes a door member that can open and close an inside of a communicating portion and a servomotor that turns the door member and forms a portion of the supply destination switching mechanism 40. The warm air exhausting portion 48 can switch between exhausting and not exhausting the warm air W produced by the refrigeration circuit 2 to the outside of the housing 10 by opening and closing the communicating portion with the door member.

The warm air exhausting portion 48A refers to the warm air exhausting portion 48 in the supply destination switching mechanism 40A and the warm air exhausting portion 48B refers to the warm air exhausting portion 48 in the supply destination switching mechanism 40B.

The cold air exhausting portion 49 is located in the side face of the housing 10 positioned near the evaporator 6 and the cold air blow outlet 13 and connects the inside and the outside of the housing 10. The cold air exhausting portion 49 includes a door member that can open and close an inside of a communicating portion and a servomotor that turns the door member and forms a portion of the supply destination switching mechanism 40.

Therefore, the cold air exhausting portion 49 can switch between exhausting and not exhausting the cold air C produced by the refrigeration circuit 2 to the outside of the housing 10 by opening and closing the communicating portion with the door member. The cold air exhausting portion 49A refers to the cold air exhausting portion 49 in the supply destination switching mechanism 40A and the cold air exhausting portion 49B refers to the cold air exhausting portion 49 in the supply destination switching mechanism 40B.

As shown in FIG. 6, the blowing switching portions 30 in the plurality of seat air-conditioning devices 1 are connected by the coordinating flow path 65 in the seat air-conditioning system 100 according to the present embodiment. The coordinating flow path 65 is formed by a pipe-shaped flow path and connects the blowing switching portion 30A of the seat air-conditioning device 1A on a side of the driver's seat and the blowing switching portion 30B of the seat air-conditioning device 1B on a side of the passenger's seat.

To put it concretely, one end of the coordinating flow path 65 is connected to a connected portion of the connecting flow path 36A and the suction port supply flow path 37 in the blowing switching portion 30A on the side of the driver's seat and the other end of the coordinating flow path 65 is connected to a connected portion of the connecting flow path 36B and the suction port supply flow path 37B in the blowing switching portion 30B on the side of the passenger's seat.

Therefore, according to the seat air-conditioning system 100, it is possible to supply the conditioned air between the seat air-conditioning device 1A on the side of the driver's seat and the seat air-conditioning device 1B on the side of the passenger's seat via the coordinating flow path 65.

As shown in FIG. 6, a coordination switching portion 66 is disposed in the coordinating flow path 65. The coordination switching portion 66 includes a door member that can open and close an inside of the flow path and a servomotor that turns the door member. The coordination switching portion 66 can switch between allowing and not allowing the conditioned air to flow through the coordinating flow path 65 by opening and closing the flow path with the door member.

Next, a control system in the seat air-conditioning system 100 according to the present embodiment will be described with reference to FIG. 7. As described above, the seat air-conditioning system 100 according to the present embodiment includes a control unit 60 for controlling the operations of the plurality of seat air-conditioning devices 1.

Figure 7:
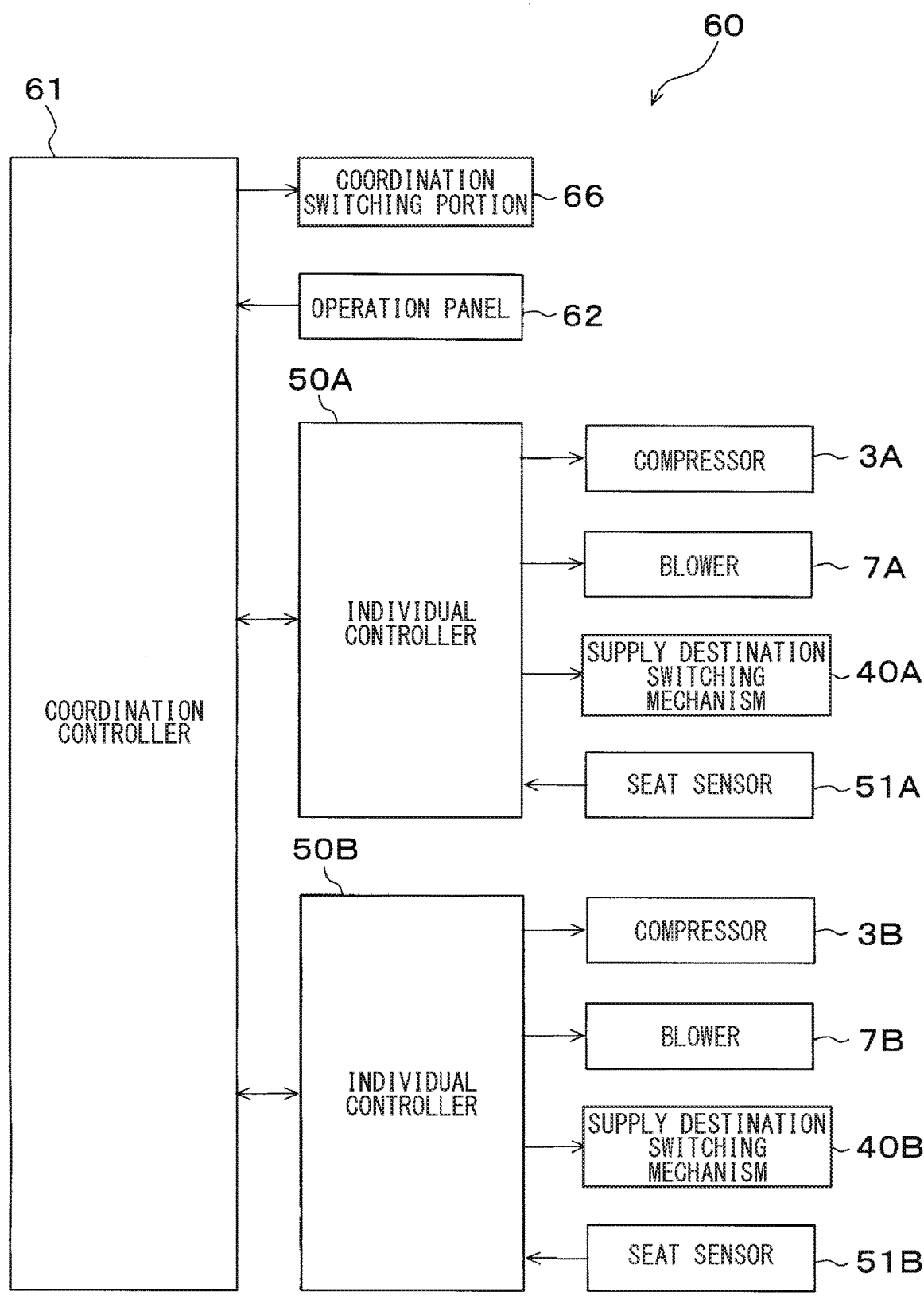
FIG. 7 is a block diagram showing a control system of the seat air-conditioning system according to the embodiment.

As shown in FIG. 7, the control unit 60 according to the present embodiment includes the individual controllers 50 for individually controlling the plurality of seat air-conditioning devices 1 forming the seat air-conditioning system 100 and a coordination controller 61 for bringing the plurality of seat air-conditioning devices 1 into the operations in the coordinated fashion.

First, the individual controllers 50 that control the operation of the respective seat air-conditioning devices 1 will be described. Each of the individual controllers 50 is formed by a microprocessor including a CPU, a ROM, RAM, and the like and peripheral circuits of the microprocessor. The individual controller 50 (i.e., the microprocessor) performs various kinds of computing and processing based on control programs stored in the ROM and controls the operations of the air-conditioning control units such as the compressor 3, the blower 7, and the blowing switching portion 30.

As shown in FIG. 7, the compressor 3, the blower 7, the supply destination switching mechanism 40, and a seat sensor 51 are connected to an output side of the individual controller 50. Therefore, the individual controller 50 (i.e., the microprocessor) can adjust refrigerant discharge performance (e.g., a refrigerant pressure) of the compressor 3 and blowing performance (e.g., a blown air volume) of the blower 7 depending on a situation that each of the seat air-conditioning devices 1 is in.

The individual controller 50 (i.e., the microprocessor) can select any of the supply destinations of the conditioned air in the seat air-conditioning device 1 by controlling the operations of the respective switching portions 41 to 47 and the like forming the supply destination switching mechanism 40.

The seat sensor 51 is a sensor for detecting presence or absence of the occupant sitting in the seat 70 and can be formed by a pressure sensor, for example. Therefore, the individual controller 50 can determine whether the seat air-conditioning system 100 can perform the coordinated operation by the detection of the presence or absence of the occupant in the seat 70.

In the seat air-conditioning system 100 according to the present embodiment, the control unit 60 includes the individual controller 50A and the individual controller 50B as shown in FIG. 7. The individual controller 50A is the individual controller 50 for controlling the operation of the seat air-conditioning device 1A on the side of the driver's seat and the individual controller 50B is the individual controller 50 for controlling the operation of the seat air-conditioning device 1B on the side of the passenger's seat.

In the control unit 60 of the seat air-conditioning system 100 according to the present embodiment, the coordination controller 61 is provided as a host system of the respective individual controllers 50. The coordination controller 61 is formed by a microprocessor including a CPU, a ROM, RAM, and the like and peripheral circuits of the microprocessor and connected to the respective individual controllers 50.

Therefore, the coordination controller 61 (i.e., the microprocessor) can control the operations of the respective seat air-conditioning devices 1 by outputting the control signals to the respective individual controllers 50 to thereby coordinate the operations of the plurality of seat air-conditioning devices 1.

To an output side of the coordination controller 61, the coordination switching portion 66 is connected. Therefore, the coordination controller 61 can switch between allowing and not allowing the conditioned air to flow through the coordinating flow path 65 by controlling the operation of the coordination switching portion 66 to thereby perform a coordination control in the seat air-conditioning system 100.

An operation panel 62 is connected to an input side of the coordination controller 61. Various operation switches related to air-conditioning operations of the seat air-conditioning system 100 and the respective seat air-conditioning devices 1 are arranged on the operation panel 62. Therefore, the occupant can request the coordination control in the seat air-conditioning system 100 by operating the operation panel 62.

With the above-described structure, the seat air-conditioning system 100 according to the present embodiment can perform the coordination control in which the plurality of seat air-conditioning devices 1 are used effectively. Modes of the coordination control that can be performed by the seat air-conditioning system 100 according to the present embodiment will be described below in detail with reference to the drawings.

In the following description, the occupant is sitting in the driver's seat 70A and no occupant is sitting in the passenger's seat 70B. Therefore, the coordination control for increasing the comfort of the occupant in the seat 70A is performed by using the seat air-conditioning device 1B on the side of the passenger's seat in addition to the seat air-conditioning device 1A on the side of the driver's seat.

In the following description, the seat air-conditioning device 1B on the side of the passenger's seat corresponds to one seat air-conditioning device in the present disclosure and the seat air-conditioning device 1A on the side of the driver's seat corresponds to the other seat air-conditioning device in the present disclosure.

First, as a mode of the coordination control in the present embodiment, a coordinated cooling mode will be described with reference to FIG. 8. The coordinated cooling mode refers to a state of providing cooling by supplying the cold air C produced by cooling operations of the plurality of seat air-conditioning devices 1 to one seat 70 in the seat air-conditioning system 100.

Figure 8:
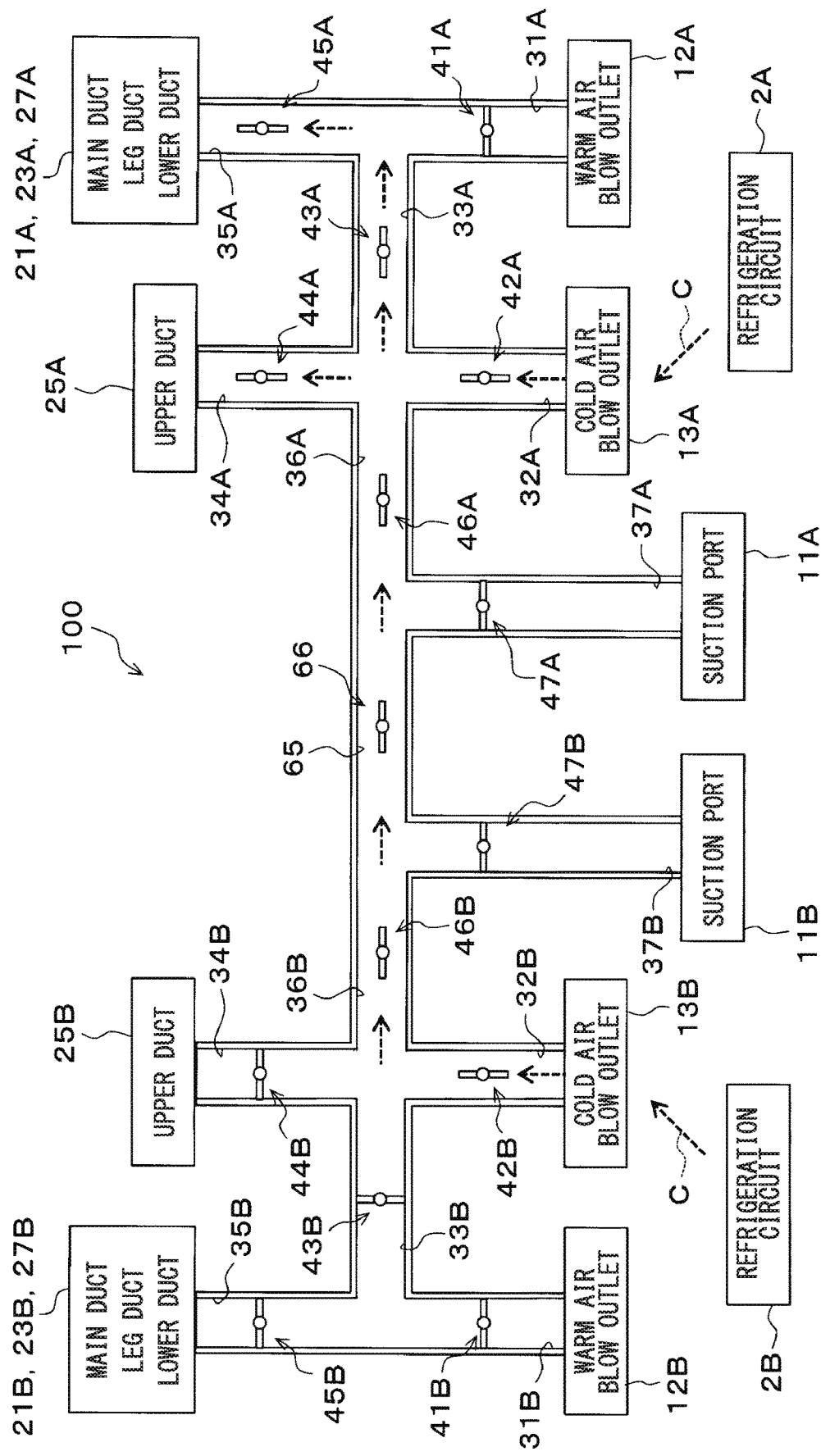
FIG. 8 is an explanatory view showing a state of the seat air-conditioning system in a coordinated cooling mode.

In an example shown in FIG. 8, the cold air C produced by the seat air-conditioning device 1A and the cold air C produced by the seat air-conditioning device 1B are supplied to the seat 70A that is the driver's seat to thereby provide the cooling. To put it concretely, first, for the seat air-conditioning device 1B on the side of the passenger's seat, the coordination controller 61 outputs the control signal related to the coordinated cooling to the individual controller 50B.

As a result, in the seat air-conditioning device 1B, the refrigeration circuit 2B and the blower 7B start to operate. At the same time, the switching portion 42B, the switching portion 46B, and the warm air exhausting portion 48B are opened and the switching portion 41B, the switching portion 43B, the switching portion 44B, the switching portion 45B, the switching portion 47B, and the cold air exhausting portion 49B are closed in the supply destination switching mechanism 40B. As a result, as shown in FIG. 8, according to the seat air-conditioning system 100, the supply destination of the cold air C produced by the seat air-conditioning device 1B is switched to the coordinating flow path 65.

The coordination controller 61 (i.e., the microprocessor) controls the operation of the coordination switching portion 66 to thereby open the inside of the coordinating flow path 65 at the same time as outputting the control signal related to the coordinated cooling. In this way, in the seat air-conditioning system 100, the cold air C flowing from the seat air-conditioning device 1B into the coordinating flow path 65 can flow into the seat air-conditioning device 1A.

The coordination controller 61 outputs the control signal related to the coordinated cooling to the individual controller 50A of the seat air-conditioning device 1A at the same time as outputting the control signal to the seat air-conditioning device 1B. As a result, in the seat air-conditioning device 1A, the refrigeration circuit 2A and the blower 7A start to operate. At the same time, the switching portion 42A, the switching portion 43A, the switching portion 44A, the switching portion 45A, the switching portion 46A, and the warm air exhausting portion 48A are opened and the switching portion 41A, the switching portion 47A, and the cold air exhausting portion 49A are closed in the supply destination switching mechanism 40A.

As a result, in the seat air-conditioning device 1A, the cold air C flowing from the seat air-conditioning device 1B and passing through the coordinating flow path 65 joins the cold air C produced by the seat air-conditioning device 1A in the blowing switching portion 30A. Then, the cold air C produced by the seat air-conditioning device 1A and the cold air C produced by the seat air-conditioning device 1B which have joined each other are supplied from all the blowing ducts (i.e., the ducts from the main ducts 21 to the lower duct 27) at the seat 70A to the occupant in the seat 70A.

In this way, according to the seat air-conditioning system 100, as shown in FIG. 8, by the operation in the coordinated cooling mode, it is possible to cool the one seat 70 with the cold air C produced by the plurality of seat air-conditioning devices 1. In other words, according to the seat air-conditioning system 100, it is possible to increase a volume of cold air C supplied to the seat 70A by effectively using the seat air-conditioning device 1B in addition to the seat air-conditioning device 1A to thereby increase the comfort of the occupant in the seat 70A.

Next, a coordinated heating mode that is a mode of the coordination control in the present embodiment will be described with reference to FIG. 9. The coordinated heating mode refers to a state of providing heating by supplying the warm air W produced by cooling operations of the plurality of seat air-conditioning devices 1 to one seat 70 in the seat air-conditioning system 100.

Figure 9:
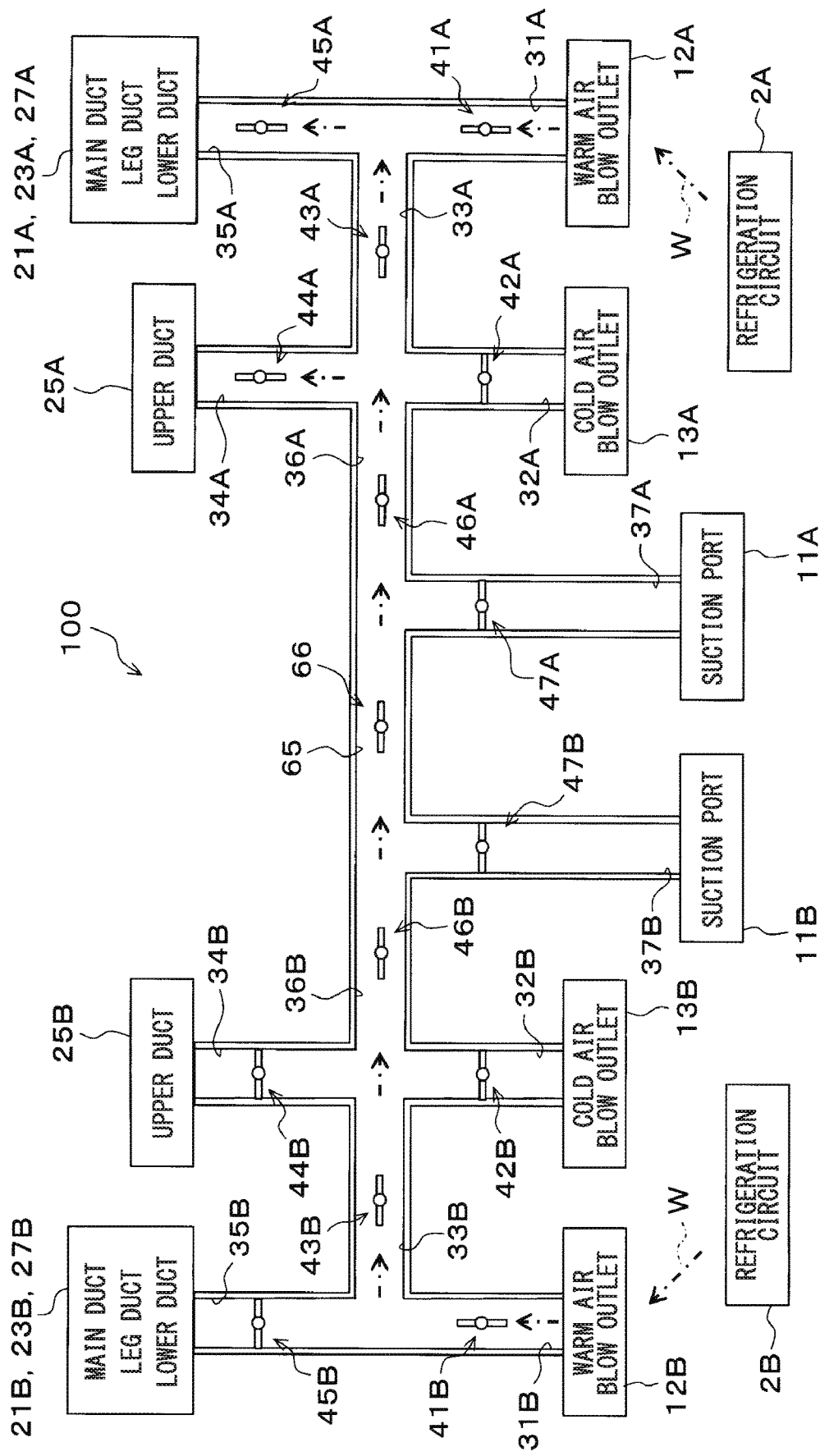
FIG. 9 is an explanatory view showing a state of the seat air-conditioning system in a coordinated heating mode.

In an example shown in FIG. 9, the warm air W produced by the seat air-conditioning device 1A and the warm air W produced by the seat air-conditioning device 1B are supplied to the seat 70A that is the driver's seat to thereby provide the heating. To put it concretely, first, for the seat air-conditioning device 1B on the side of the passenger's seat, the coordination controller 61 outputs the control signal related to the coordinated heating to the individual controller 50B.

As a result, in the seat air-conditioning device 1B, the refrigeration circuit 2B and the blower 7B start to operate. At the same time, the switching portion 41B, the switching portion 43B, the switching portion 46B, and the cold air exhausting portion 49B are opened and the switching portion 42B, the switching portion 44B, the switching portion 45B, the switching portion 47B, and the warm air exhausting portion 48B are closed in the supply destination switching mechanism 40B. As a result, as shown in FIG. 9, according to the seat air-conditioning system 100, the supply destination of the warm air W produced by the seat air-conditioning device 1B is switched to the coordinating flow path 65.

The coordination controller 61 (i.e., the microprocessor) controls the operation of the coordination switching portion 66 to thereby open the inside of the coordinating flow path 65 at the same time as outputting the control signal related to the coordinated heating. In this way, in the seat air-conditioning system 100, the warm air W flowing from the seat air-conditioning device 1B into the coordinating flow path 65 can flow into the seat air-conditioning device 1A.

The coordination controller 61 outputs the control signal related to the coordinated heating to the individual controller 50A of the seat air-conditioning device 1A at the same time as outputting the control signal to the seat air-conditioning device 1B. As a result, in the seat air-conditioning device 1A, the refrigeration circuit 2A and the blower 7A start to operate.

At the same time, the switching portion 41A, the switching portion 43A, the switching portion 44A, the switching portion 45A, the switching portion 46A, and the cold air exhausting portion 49A are opened and the switching portion 42A, the switching portion 47A, and the warm air exhausting portion 48A are closed in the supply destination switching mechanism 40A.

As a result, in the seat air-conditioning device 1A, the warm air W flowing from the seat air-conditioning device 1B and passing through the coordinating flow path 65 joins the warm air W produced by the seat air-conditioning device 1A in the blowing switching portion 30A. Then, the warm air W produced by the seat air-conditioning device 1A and the warm air W produced by the seat air-conditioning device 1B which have joined each other are supplied from all the blowing ducts (i.e., the ducts from the main ducts 21 to the lower duct 27) at the seat 70A to the occupant in the seat 70A.

In this way, according to the seat air-conditioning system 100, as shown in FIG. 9, by the operation in the coordinated heating mode, it is possible to heat the one seat 70 with the warm air W produced by the plurality of seat air-conditioning devices 1. In other words, according to the seat air-conditioning system 100, it is possible to increase a volume of warm air W supplied to the seat 70A by effectively using the seat air-conditioning device 1B in addition to the seat air-conditioning device 1A to thereby increase the comfort of the occupant in the seat 70A.

Next, a defrosting mode that is a mode of the coordination control in the present embodiment will be described with reference to FIGS. 10 and 11.

In the seat air-conditioning device 1 in the present embodiment, frost may form on the evaporator 6 when the heating operation is continued. If the frost formation on the evaporator 6 proceeds, heat exchange performance of the evaporator 6 decreases, which decreases heating performance of the seat air-conditioning device 1.

The defrosting mode according to the coordination control in the present embodiment refers to a state of performing defrosting of the evaporator 6 in order to prevent the frost formation on the evaporator 6 in each of the seat air-conditioning devices 1 while continuing the heating of the seat 70.

The defrosting mode includes two states, i.e., a self-heating state and a defrosting state for the seat air-conditioning device 1 of the seat 70 to be heated. The self-heating state is a state of performing the defrosting by heating the seat 70 to be heated with the seat air-conditioning device 1 disposed at this seat 70 and stopping the operation of the other seat air-conditioning device 1 in the seat air-conditioning system 100.

On the other hand, the defrosting state is a state of performing the defrosting by heating the seat 70 to be heated with the other seat air-conditioning device 1 in the seat air-conditioning system 100 and stopping the operation of the seat air-conditioning device 1 disposed at this seat 70.

First, the self-heating state will be described with reference to FIG. 10. The self-heating state in the defrosting mode shown in FIG. 10 is a state in which the seat 70 to be heated is the driver's seat 70A and this seat 70A is heated by the seat air-conditioning device 1A. In this case, the coordination controller 61 outputs the control signal indicating the self-heating state in the defrosting mode to the individual controller 50A.

As a result, in the seat air-conditioning device 1A, the refrigeration circuit 2A and the blower 7A are started. At the same time, the switching portion 41A, the switching portion 43A, the switching portion 44A, the switching portion 45A, and the cold air exhausting portion 49A are opened and the switching portion 42A, the switching portion 46A, the switching portion 47A, and the warm air exhausting portion 48A are closed in the supply destination switching mechanism 40A.

At this time, the coordination controller 61 outputs the control signal indicating the self-heating state in the defrosting mode to the individual controller 50B of the seat air-conditioning device 1B at the same time as outputting the control signal to the seat air-conditioning device 1A. As a result, the individual controller 50B stops the heating operation by the seat air-conditioning device 1B and closes the respective switching portions forming the supply destination switching mechanism 40B. The coordination controller 61 closes the coordination switching portion 66.

As a result, in the seat air-conditioning device 1A, the warm air W produced by the seat air-conditioning device 1A is supplied from all the blowing ducts (i.e., the ducts from the main ducts 21 to the lower duct 27) at the seat 70A to the occupant in the seat 70A. At this time, because the heating operation is stopped in the seat air-conditioning device 1B, the frost formed on the evaporator 6B melts naturally and is removed.

Figure 10:
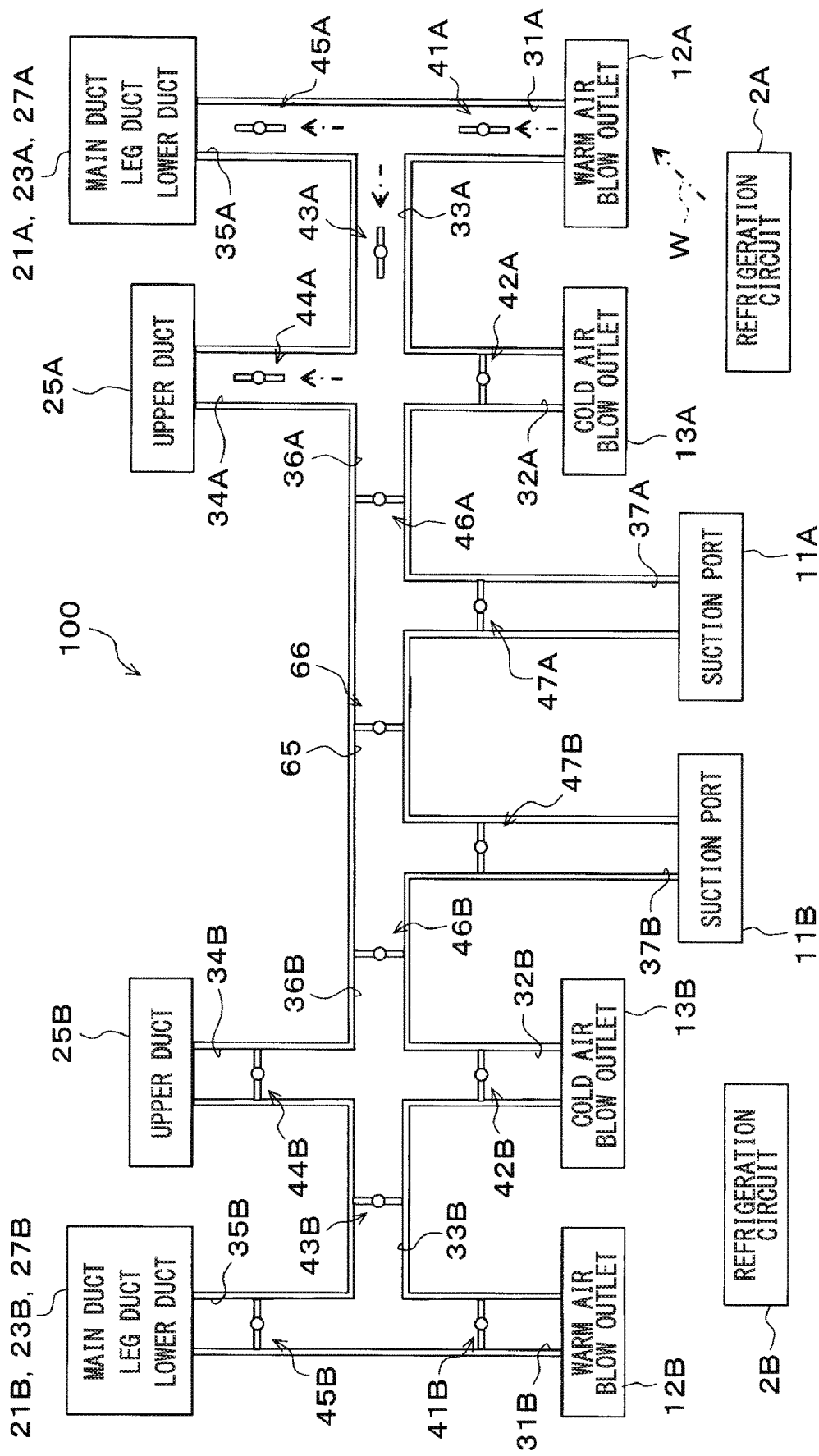
FIG. 10 is an explanatory view showing a state of the seat air-conditioning system in a self-heating state in a defrosting mode.

The state of the seat air-conditioning device 1B in the self-heating state is not restricted to the state shown in FIG. 10. In other words, it is only necessary that the heating operation in the seat air-conditioning device 1B is stopped as for the state of the seat air-conditioning device 1B in the self-heating state and the state of the supply destination switching mechanism 40B can be changed if necessary.

Next, the defrosting state will be described with reference to FIG. 11. The defrosting state in the defrosting mode shown in FIG. 11 is a state in which the seat 70 to be heated is the driver's seat 70A and this seat 70A is heated by the seat air-conditioning device 1B on the side of the passenger's seat. In this case, the coordination controller 61 outputs the control signal indicating the defrosting state in the defrosting mode to the individual controller 50B.

As a result, in the seat air-conditioning device 1B, the refrigeration circuit 2B and the blower 7B start to operate. At the same time, the switching portion 41B, the switching portion 43B, the switching portion 46B, and the cold air exhausting portion 49B are opened and the switching portion 42B, the switching portion 44B, the switching portion 45B, the switching portion 47B, and the warm air exhausting portion 48B are closed in the supply destination switching mechanism 40B. As a result, as shown in FIG. 11, according to the seat air-conditioning system 100, the supply destination of the warm air W produced by the seat air-conditioning device 1B is switched to the coordinating flow path 65.

At the same time, the coordination controller 61 (i.e., the microprocessor) controls the operation of the coordination switching portion 66 to thereby open the inside of the coordinating flow path 65. In this way, in the seat air-conditioning system 100, the warm air W flowing from the seat air-conditioning device 1B into the coordinating flow path 65 can flow into the seat air-conditioning device 1A.

The coordination controller 61 outputs the control signal indicating the defrosting state in the defrosting mode to the individual controller 50A of the seat air-conditioning device 1A at the same time as outputting the control signal to the seat air-conditioning device 1B. As a result, the individual controller 50A stops the heating operation by the seat air-conditioning device 1A and controls the respective switching portions of the supply destination switching mechanism 40A.

To put it concretely, the switching portion 43A, the switching portion 44A, the switching portion 45A, the switching portion 46A are opened and the switching portion 41A, the switching portion 42A, the switching portion 47A, the warm air exhausting portion 48A, and the cold air exhausting portion 49A are closed in the supply destination switching mechanism 40A.

As a result, in the seat air-conditioning device 1A, the warm air W flowing in from the seat air-conditioning device 1B via the coordinating flow path 65 is supplied from all the blowing ducts (i.e., the ducts from the main ducts 21 to the lower duct 27) at the seat 70A to the occupant in the seat 70A. At this time, because the heating operation is stopped in the seat air-conditioning device 1A, the frost formed on the evaporator 6A melts naturally and is removed.

As described above, in the seat air-conditioning system 100 according to the present embodiment, by performing the defrosting mode as the coordination control and alternately switching between the self-heating state and the defrosting state, it is possible to prevent the frost formation on the evaporator 6A and the evaporator 6B in the seat air-conditioning system 100 while continuing the heating of the seat 70 to be heated.

Next, a head-cool feet-warm mode that is a mode of the coordination control in the present embodiment will be described with reference to FIG. 12. The head-cool feet-warm mode refers to a state in which the cold air C produced in one seat air-conditioning device 1 out of the plurality of seat air-conditioning devices 1 forming the seat air-conditioning system 100 is supplied from the upper blow outlets 26 of the seat 70 and the warm air W produced in the other seat air-conditioning device 1 is supplied from the lower blow outlet 28 of the seat 70.

Figure 12:
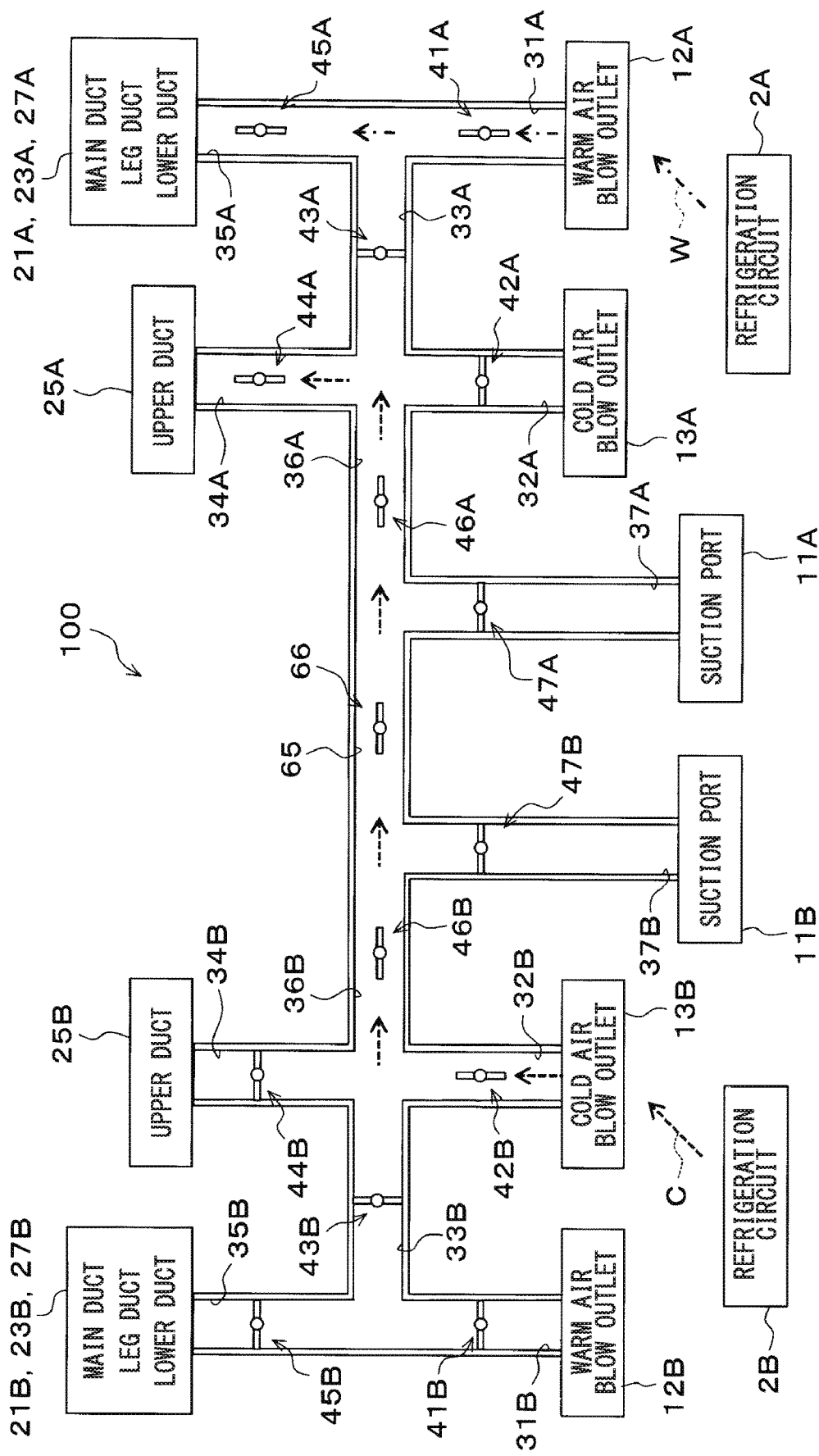
FIG. 12 is an explanatory view showing a state of the seat air-conditioning system in a head-cool feet-warm mode.

In the example shown in FIG. 12, the cold air C produced by the seat air-conditioning device 1B is supplied through the upper ducts 25A of the seat 70A and, at the same time, the warm air W produced by the seat air-conditioning device 1A is supplied through the blowing ducts such as the lower duct 27A of the seat 70A.

By supplying the warm air W and the cold air C in this manner, the seat air-conditioning system 100 can bring the occupant sitting in the seat 70A into what is called a head-cool feet-warm state to thereby increase the comfort of the occupant.

To put it concretely, first, for the seat air-conditioning device 1B on the side of the passenger's seat, the coordination controller 61 outputs the control signal related to the head-cool feet-warm mode to the individual controller 50B. As a result, in the seat air-conditioning device 1B, the refrigeration circuit 2B and the blower 7B start to operate.

At the same time, the switching portion 42B, the switching portion 46B, and the warm air exhausting portion 48B are opened and the switching portion 41B, the switching portion 43B, the switching portion 44B, the switching portion 45B, the switching portion 47B, and the cold air exhausting portion 49B are closed in the supply destination switching mechanism 40B. As a result, as shown in FIG. 12, according to the seat air-conditioning system 100, the supply destination of the cold air C produced by the seat air-conditioning device 1B is switched to the coordinating flow path 65.

The coordination controller 61 (i.e., the microprocessor) controls the operation of the coordination switching portion 66 to thereby open the inside of the coordinating flow path 65 at the same time as outputting the control signal related to the head-cool feet-warm mode. In this way, in the seat air-conditioning system 100, the cold air C flowing from the seat air-conditioning device 1B into the coordinating flow path 65 can flow into the seat air-conditioning device 1A.

The coordination controller 61 outputs the control signal related to the head-cool feet-warm mode to the individual controller 50A of the seat air-conditioning device 1A at the same time as outputting the control signal to the seat air-conditioning device 1B. As a result, in the seat air-conditioning device 1A, the refrigeration circuit 2A and the blower 7A start to operate.

At the same time, the switching portion 41A, the switching portion 44A, the switching portion 45A, the switching portion 46A, and the cold air exhausting portion 49A are opened and the switching portion 42A, the switching portion 43A, the switching portion 47A, and the warm air exhausting portion 48A are closed in the supply destination switching mechanism 40A.

Because the switching portion 44A and the switching portion 46A are opened and the switching portion 42 and the switching portion 43A are closed in the supply destination switching mechanism 40A, the cold air C flowing from the coordinating flow path 65 into the supply destination switching mechanism 40A is led into the upper ducts 25A of the seat 70A without passing through the main flow path 33.

Because the switching portion 41A and the switching portion 45A are opened and the switching portion 43A is closed in the supply destination switching mechanism 40A, the warm air W flowing in from the warm air blow outlets 12A is led into the main ducts 21A, the leg ducts 23A, and the lower duct 27A of the seat 70A.

In this way, at the seat 70A, the cold air C is supplied to the area including the head of the occupant through the upper ducts 25A and the warm air W is supplied to the trunk and the feet of the occupant through the main ducts 21A, the leg ducts 23A, and the lower duct 27A. In other words, the seat air-conditioning system 100 can keep the area including the head of the occupant at a low temperature while warming the trunk and the lower part of the occupant sitting in the seat 70A.

In this way, according to the seat air-conditioning system 100, as shown in FIG. 12, by the operation in the head-cool feet-warm mode, it is possible to supply the warm air W and the cold air C to the one seat 70 by individual routes to thereby achieve what is called the head-cool feet-warm state, which increases the comfort of the occupant in the seat 70A.

Next, a two-stage cooling mode that is a mode of the coordination control in the present embodiment will be described with reference to FIG. 13. The two-stage cooling mode refers to a state of providing cooling by cooling cold air C produced by a cooling operation of one seat air-conditioning device 1 with a cooling operation of the other seat air-conditioning device 1 and supplying the cold air C to one seat 70 in the seat air-conditioning system 100. In other words, in the two-stage cooling mode, blown air is cooled in stages by using the two seat air-conditioning devices 1 in the seat air-conditioning system 100.

Figure 13:
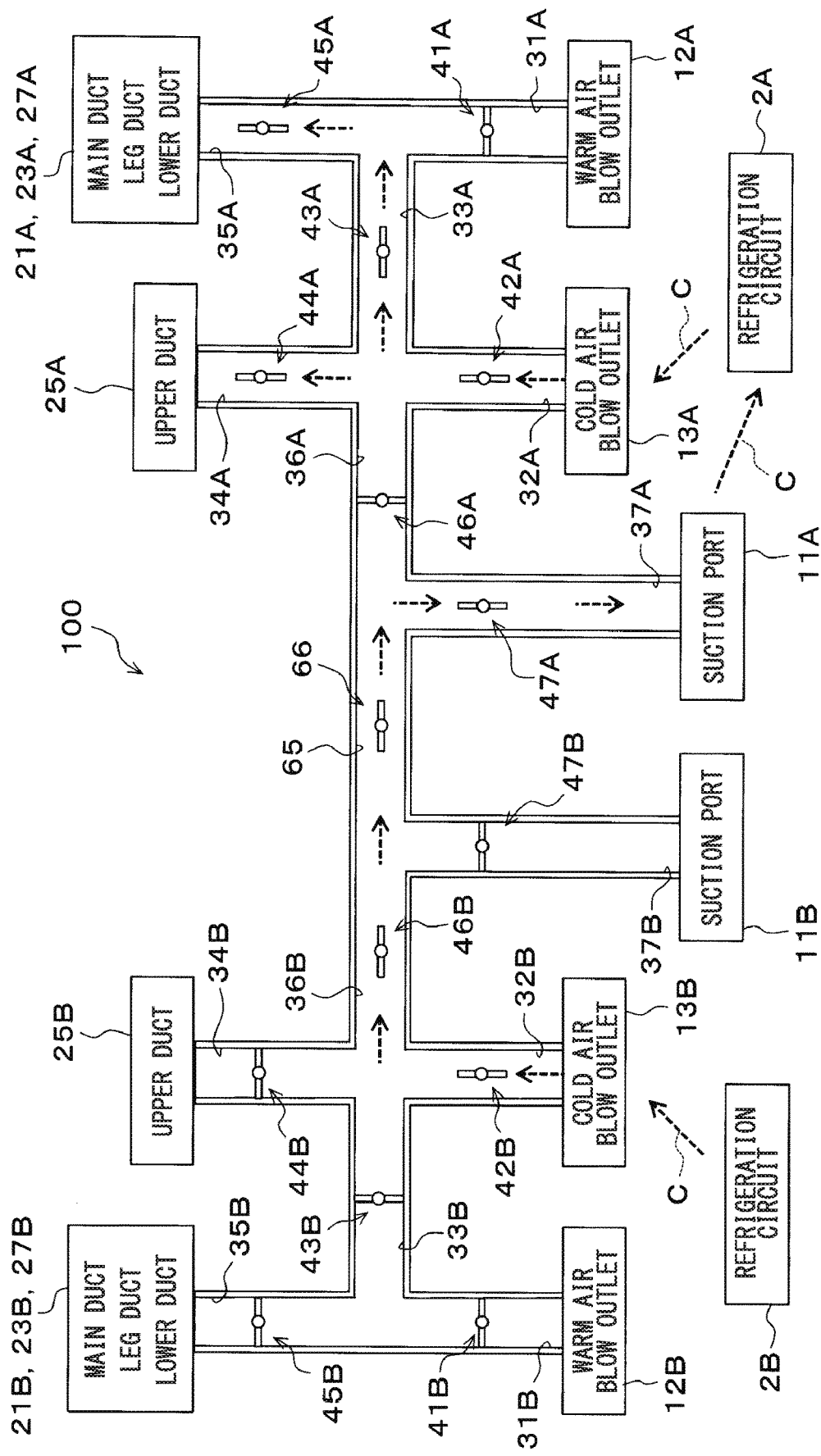
FIG. 13 is an explanatory view showing a state of the seat air-conditioning system in a two-stage cooling mode.

In an example shown in FIG. 13, the cold air C produced by the seat air-conditioning device 1B is supplied to the seat air-conditioning device 1A and the cold air C cooled by the seat air-conditioning device 1A is supplied to the seat 70A that is the driver's seat to thereby provide the cooling. To put it concretely, first, for the seat air-conditioning device 1B on the side of the passenger's seat, the coordination controller 61 outputs the control signal related to the two-stage cooling to the individual controller 50B.

As a result, in the seat air-conditioning device 1B, the refrigeration circuit 2B and the blower 7B start to operate. At the same time, the switching portion 42B, the switching portion 46B, and the warm air exhausting portion 48B are opened and the switching portion 41B, the switching portion 43B, the switching portion 44B, the switching portion 45B, the switching portion 47B, and the cold air exhausting portion 49B are closed in the supply destination switching mechanism 40B. As a result, as shown in FIG. 13, according to the seat air-conditioning system 100, the supply destination of the cold air C produced by the seat air-conditioning device 1B is switched to the coordinating flow path 65.

The coordination controller 61 (i.e., the microprocessor) controls the operation of the coordination switching portion 66 to thereby open the inside of the coordinating flow path 65 at the same time as outputting the control signal related to the coordinated cooling. In this way, in the seat air-conditioning system 100, the cold air C flowing from the seat air-conditioning device 1B into the coordinating flow path 65 can flow into the seat air-conditioning device 1A.

The coordination controller 61 outputs the control signal related to the two-stage cooling to the individual controller 50A of the seat air-conditioning device 1A at the same time as outputting the control signal to the seat air-conditioning device 1B. As a result, in the seat air-conditioning device 1A, the refrigeration circuit 2A and the blower 7A start to operate.

At the same time, the switching portion 42A, the switching portion 43A, the switching portion 44A, the switching portion 45A, the switching portion 47A, and the warm air exhausting portion 48A are opened and the switching portion 41A, the switching portion 46A, and the cold air exhausting portion 49A are closed in the supply destination switching mechanism 40A.

As a result, because the switching portion 46A is closed and the switching portion 47A is opened in the supply destination switching mechanism 40A in the seat air-conditioning device 1A, the cold air C flowing from the seat air-conditioning device 1B via the coordinating flow path 65 is led to the suction port 11A via the suction port supply flow path 37A.

As described above, in the seat air-conditioning device 1A, a temperature of the air drawn in from the suction port 11A is adjusted by the refrigeration circuit 2A and the air is supplied from the warm air blow outlets 12A and the cold air blow outlets 13A. Therefore, the seat air-conditioning device 1A can adjust a temperature of the cold air C produced by the seat air-conditioning device 1B with the refrigeration circuit 2A and supply the air as the cold air C.

Because the switching portion 42A, the switching portion 43A, the switching portion 44A, the switching portion 45A, and the warm air exhausting portion 48A are opened and the switching portion 41A, the switching portion 46A, and the cold air exhausting portion 49A are closed in the supply destination switching mechanism 40A in the seat air-conditioning device 1A, the cold air C cooled in the seat air-conditioning device 1A is supplied from all the blowing ducts at the seat 70A to the occupant in the seat 70A.

In this way, according to the seat air-conditioning system 100, as shown in FIG. 13, by the operation in the two-stage cooling mode, it is possible to cool the seat 70 with the cold air C cooled in stages by the plurality of seat air-conditioning devices 1. In other words, according to the seat air-conditioning system 100, it is possible to increase the comfort of the occupant in the seat 70A by effectively using the seat air-conditioning device 1B in addition to the seat air-conditioning device 1A.

Next, a two-stage heating mode that is a mode of the coordination control in the present embodiment will be described with reference to FIG. 14. The two-stage heating mode refers to a state of providing heating by heating warm air W produced by a heating operation of one seat air-conditioning device 1 with a heating operation of the other seat air-conditioning device 1 and supplying the warm air W to one seat 70 in the seat air-conditioning system 100. In other words, in the two-stage heating mode, blown air is heated in stages by using the two seat air-conditioning devices 1 in the seat air-conditioning system 100.

Figure 14:
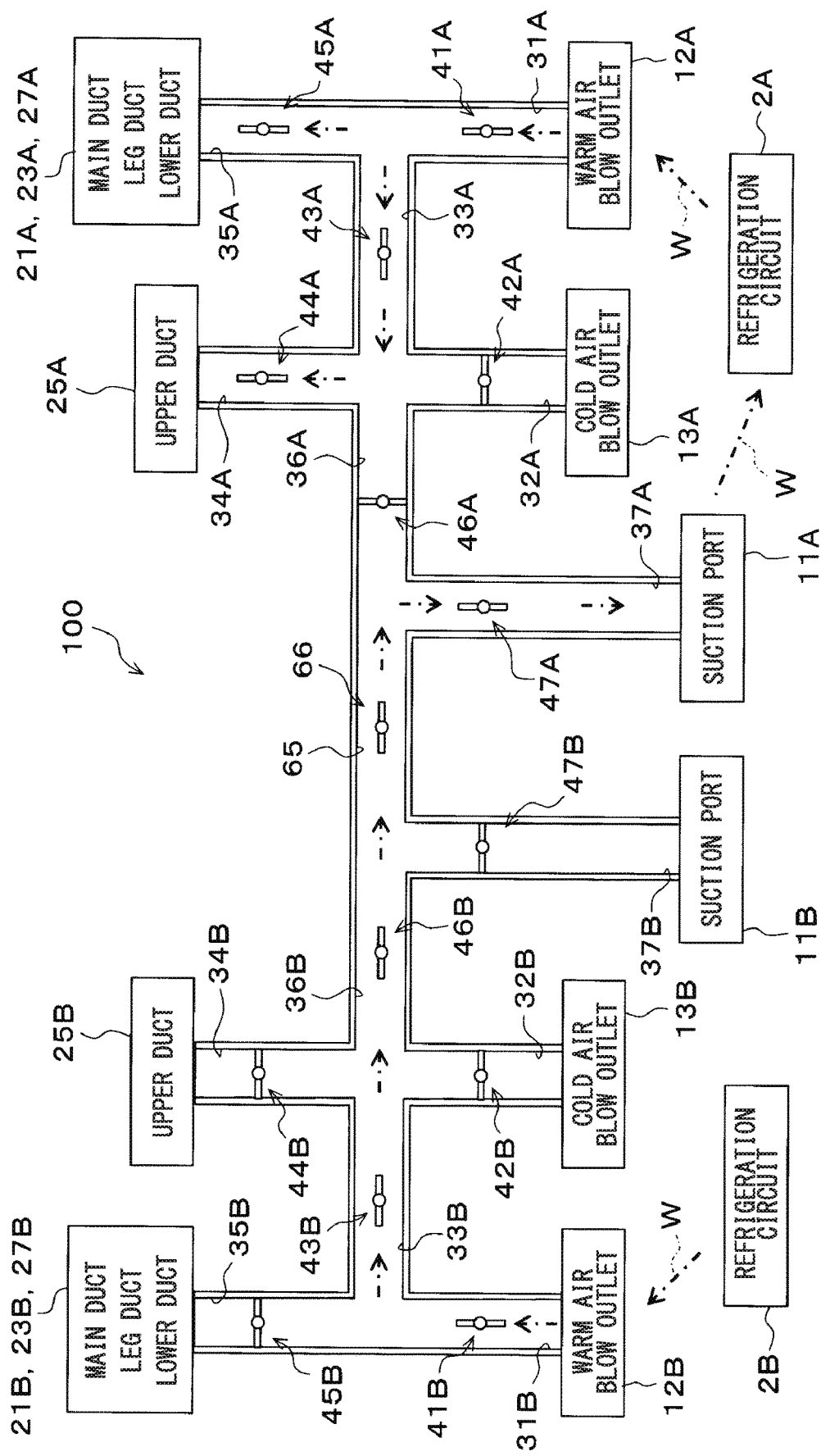
FIG. 14 is an explanatory view showing a state of the seat air-conditioning system in a two-stage heating mode.

In an example shown in FIG. 14, the warm air W produced by the seat air-conditioning device 1B is supplied to the seat air-conditioning device 1A and the warm air W heated by the seat air-conditioning device 1A is supplied to the seat 70A that is the driver's seat to thereby provide the heating. To put it concretely, first, for the seat air-conditioning device 1B on the side of the passenger's seat, the coordination controller 61 outputs the control signal related to the two-stage heating to the individual controller 50B.

As a result, in the seat air-conditioning device 1B, the refrigeration circuit 2B and the blower 7B start to operate. At the same time, the switching portion 41B, the switching portion 43B, the switching portion 46B, and the cold air exhausting portion 49B are opened and the switching portion 42B, the switching portion 44B, the switching portion 45B, the switching portion 47B, and the warm air exhausting portion 48B are closed in the supply destination switching mechanism 40B. As a result, as shown in FIG. 14, according to the seat air-conditioning system 100, the supply destination of the warm air W produced by the seat air-conditioning device 1B is switched to the coordinating flow path 65.

The coordination controller 61 (i.e., the microprocessor) controls the operation of the coordination switching portion 66 to thereby open the inside of the coordinating flow path 65 at the same time as outputting the control signal related to the coordinated cooling. In this way, in the seat air-conditioning system 100, the warm air W flowing from the seat air-conditioning device 1B into the coordinating flow path 65 can flow into the seat air-conditioning device 1A.

The coordination controller 61 outputs the control signal related to the two-stage heating to the individual controller 50A of the seat air-conditioning device 1A at the same time as outputting the control signal to the seat air-conditioning device 1B. As a result, in the seat air-conditioning device 1A, the refrigeration circuit 2A and the blower 7A start to operate.

At the same time, the switching portion 41A, the switching portion 43A, the switching portion 44A, the switching portion 45A, the switching portion 47A, and the cold air exhausting portion 49A are opened and the switching portion 42A, the switching portion 46A, and the warm air exhausting portion 48A are closed in the supply destination switching mechanism 40A.

As a result, because the switching portion 46A is closed and the switching portion 47A is opened in the supply destination switching mechanism 40A in the seat air-conditioning device 1A, the warm air W flowing from the seat air-conditioning device 1B via the coordinating flow path 65 is led to the suction port 11A via the suction port supply flow path 37A.

As described above, in the seat air-conditioning device 1A, a temperature of the air drawn in from the suction port 11A is adjusted by the refrigeration circuit 2A and the air is supplied from the warm air blow outlets 12A and the cold air blow outlets 13A. Therefore, the seat air-conditioning device 1A can adjust a temperature of the warm air W produced by the seat air-conditioning device 1B with the refrigeration circuit 2A and supply the air as the warm air W.

Because the switching portion 41A, the switching portion 43A, the switching portion 44A, the switching portion 45A, and the warm air exhausting portion 48A are opened and the switching portion 42A, the switching portion 46A, and the cold air exhausting portion 49A are closed in the supply destination switching mechanism 40A in the seat air-conditioning device 1A, the warm air W heated in the seat air-conditioning device 1A is supplied from all the blowing ducts at the seat 70A to the occupant in the seat 70A.

In this way, according to the seat air-conditioning system 100, as shown in FIG. 14, by the operation in the two-stage heating mode, it is possible to heat the seat 70 with the warm air W heated in stages by the plurality of seat air-conditioning devices 1. In other words, according to the seat air-conditioning system 100, it is possible to increase the comfort of the occupant in the seat 70A by effectively using the seat air-conditioning device 1B in addition to the seat air-conditioning device 1A.

Next, a dehumidification heating mode that is a mode of the coordination control in the present embodiment will be described with reference to FIG. 15. The dehumidification heating mode refers to a state of heating cold air C dehumidified by a cooling operation of one seat air-conditioning device 1 with a heating operation of the other seat air-conditioning device 1 and supplying the air to one seat 70 in the seat air-conditioning system 100.

Figure 15:
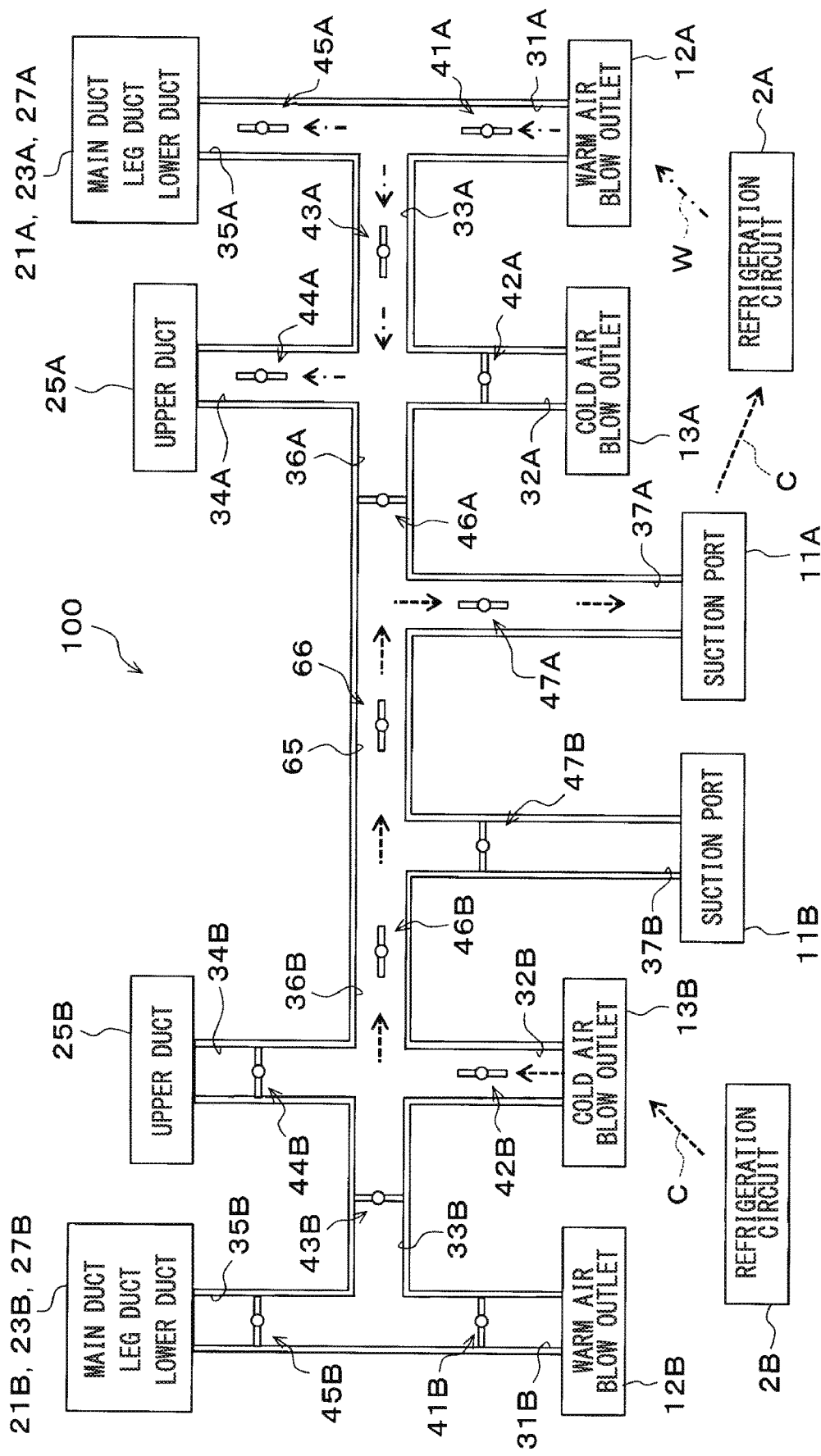
FIG. 15 is an explanatory view showing a state of the seat air-conditioning system in a dehumidification heating mode.

In an example shown in FIG. 15, the cold air C dehumidified by the seat air-conditioning device 1B is supplied to the seat air-conditioning device 1A and the warm air W heated by the seat air-conditioning device 1A is supplied to the seat 70A that is the driver's seat. To put it concretely, first, for the seat air-conditioning device 1B on the side of the passenger's seat, the coordination controller 61 outputs the control signal related to the dehumidification heating to the individual controller 50B.

As a result, in the seat air-conditioning device 1B, the refrigeration circuit 2B and the blower 7B start to operate. At the same time, the switching portion 42B, the switching portion 46B, and the warm air exhausting portion 48B are opened and the switching portion 41B, the switching portion 43B, the switching portion 44B, the switching portion 45B, the switching portion 47B, and the cold air exhausting portion 49B are closed in the supply destination switching mechanism 40B. As a result, as shown in FIG. 15, according to the seat air-conditioning system 100, the supply destination of the cold air C produced by the seat air-conditioning device 1B is switched to the coordinating flow path 65.

The coordination controller 61 (i.e., the microprocessor) controls the operation of the coordination switching portion 66 to thereby open the inside of the coordinating flow path 65 at the same time as outputting the control signal related to the coordinated cooling. In this way, in the seat air-conditioning system 100, the cold air C flowing from the seat air-conditioning device 1B into the coordinating flow path 65 can flow into the seat air-conditioning device 1A.

The coordination controller 61 outputs the control signal related to the dehumidification heating to the individual controller 50A of the seat air-conditioning device 1A at the same time as outputting the control signal to the seat air-conditioning device 1B. As a result, in the seat air-conditioning device 1A, the refrigeration circuit 2A and the blower 7A start to operate.

At the same time, the switching portion 41A, the switching portion 43A, the switching portion 44A, the switching portion 45A, the switching portion 47A, and the cold air exhausting portion 49A are opened and the switching portion 42A, the switching portion 46A, and the warm air exhausting portion 48A are closed in the supply destination switching mechanism 40A.

As a result, because the switching portion 46A is closed and the switching portion 47A is opened in the supply destination switching mechanism 40A in the seat air-conditioning device 1A, the cold air C flowing from the seat air-conditioning device 1B via the coordinating flow path 65 is led to the suction port 11A via the suction port supply flow path 37A.

As described above, in the seat air-conditioning device 1A, a temperature of the air drawn in from the suction port 11A is adjusted by the refrigeration circuit 2A and the air is supplied from the warm air blow outlets 12A and the cold air blow outlets 13A. Therefore, the seat air-conditioning device 1A can adjust, by heating, a temperature of the cold air C dehumidified by the seat air-conditioning device 1B with the refrigeration circuit 2A and supply the air as the warm air W.

Because the switching portion 41A, the switching portion 43A, the switching portion 44A, the switching portion 45A, and the warm air exhausting portion 48A are opened and the switching portion 42A, the switching portion 46A, and the cold air exhausting portion 49A are closed in the supply destination switching mechanism 40A in the seat air-conditioning device 1A, the warm air W heated in the seat air-conditioning device 1A is supplied from all the blowing ducts at the seat 70A to the occupant in the seat 70A.

In this way, according to the seat air-conditioning system 100, as shown in FIG. 15, by the operation in the dehumidification heating mode, it is possible to heat the cold air C dehumidified by the one seat air-conditioning device 1 with the other seat air-conditioning device 1 to supply the air to thereby provide the dehumidification heating to the one seat 70. In other words, according to the seat air-conditioning system 100, it is possible to increase the comfort of the occupant in the seat 70A by effectively using the seat air-conditioning device 1B in addition to the seat air-conditioning device 1A.

As described above, in the seat air-conditioning system 100 according to the present embodiment, each of the seat air-conditioning devices 1 can achieve comfortable air conditioning adapted to each of the seats 70 in the vehicle interior at each of the seats 70 by controlling the operations of the refrigeration circuit 2, the blower 7, and the blowing switching portion 30.

The coordinating flow path 65 is disposed in the seat air-conditioning system 100 and connects the blowing switching portion 30A of the seat air-conditioning device 1A and the blowing switching portion 30B of the seat air-conditioning device 1B forming the seat air-conditioning system 100. Therefore, according to the seat air-conditioning system 100, it is possible to supply the conditioned air between the seat air-conditioning device 1A and the seat air-conditioning device 1B via the coordinating flow path 65.

In other words, according to the seat air-conditioning system 100, it is possible to perform air conditioning for the seat 70A or the seat 70B by using the seat air-conditioning device 1A and the seat air-conditioning device 1B, which enhances air-conditioning performance for the occupant sitting in the seat 70.

According to the seat air-conditioning system 100, the operations of the seat air-conditioning device 1A and the seat air-conditioning device 1B are performed individually and can be performed at different times and in the different modes as shown in FIGS. 8 to 15 and therefore it is possible to achieve various kinds of air conditioning for the occupant sitting in the seat 70 to thereby increase the comfort of the occupant.

As shown in FIG. 8, according to the seat air-conditioning system 100, by performing the coordination control in the coordinated cooling mode, it is possible to supply the cold air C produced by the seat air-conditioning device 1A and the cold air C produced by the seat air-conditioning device 1B to the seat 70A. In other words, with the seat air-conditioning system 100, it is possible to increase a volume of cold air C supplied to the seat 70A by effectively using the seat air-conditioning device 1B in addition to the seat air-conditioning device 1A to thereby increase the comfort of the occupant in the seat 70A.

As shown in FIG. 9, according to the seat air-conditioning system 100, by performing the coordination control in the coordinated heating mode, it is possible to supply the warm air W produced by the seat air-conditioning device 1A and the warm air W produced by the seat air-conditioning device 1B to the seat 70A. In other words, with the seat air-conditioning system 100, it is possible to increase a volume of warm air W supplied to the seat 70A by effectively using the seat air-conditioning device 1B in addition to the seat air-conditioning device 1A to thereby increase the comfort of the occupant in the seat 70A.

Figure 11:
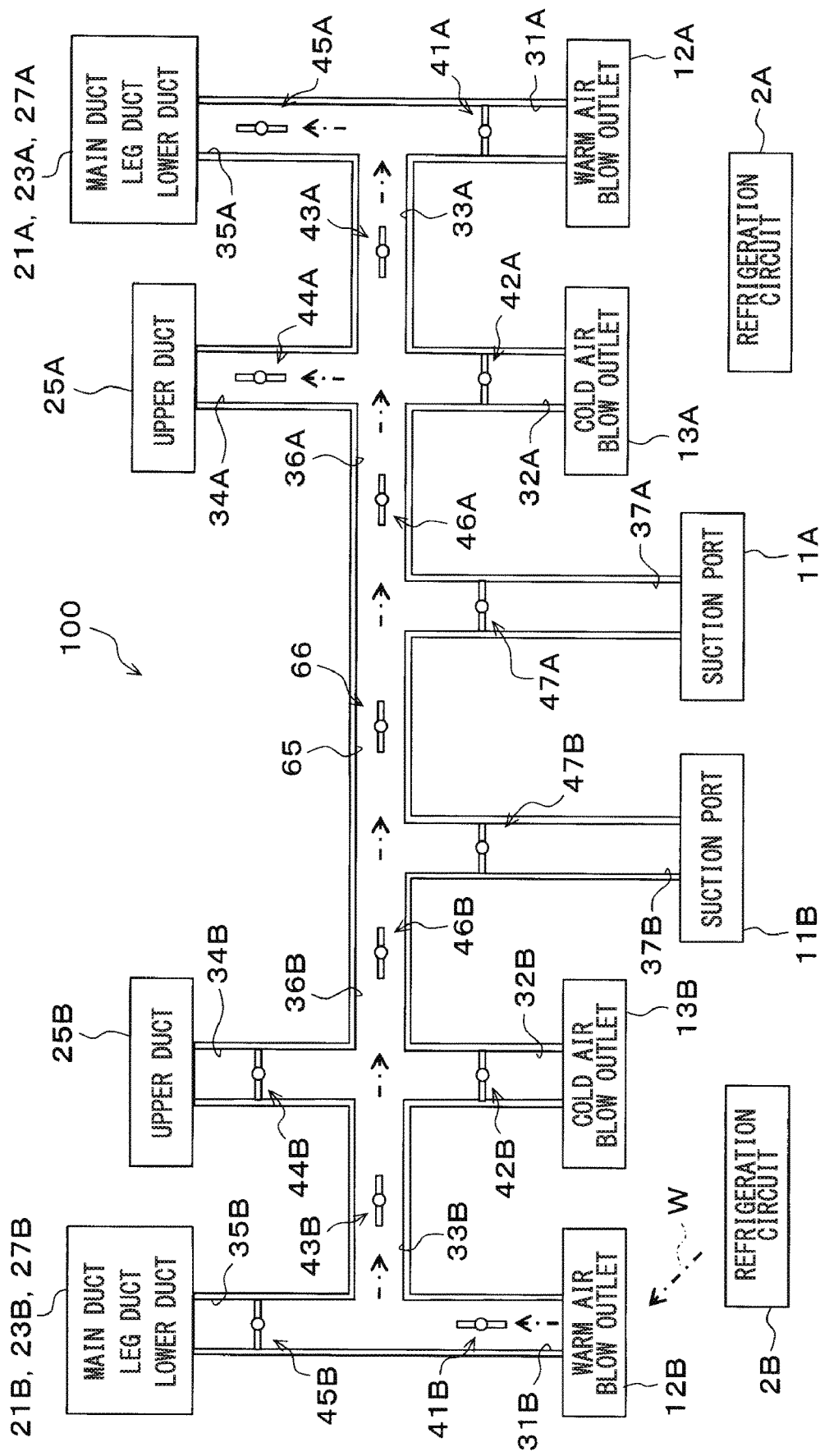
FIG. 11 is an explanatory view showing a state of the seat air-conditioning system in a defrosting state in the defrosting mode.

As shown in FIGS. 10 and 11, according to the seat air-conditioning system 100, by performing the coordination control in the dehumidifying mode and alternately repeating the self-heating state and the defrosting state, it is possible to prevent the frost formation on the evaporator 6A and the evaporator 6B in the seat air-conditioning system 100 while continuing the heating of the seat 70A to be heated.

As shown in FIG. 12, according to the seat air-conditioning system 100, by performing the coordination control in the head-cool feet-warm mode, it is possible to supply the cold air C produced by the seat air-conditioning device 1B to the area including the head of the occupant through the upper ducts 25A of the seat 70A and the warm air produced by the seat air-conditioning device 1A to the trunk and the feet of the occupant through the lower duct 27A and the like of the seat 70A.

In other words, the seat air-conditioning system 100 can keep the area including the head of the occupant at the low temperature while warming the trunk and the lower part of the occupant sitting in the seat 70A to thereby increase the comfort of the occupant in the seat 70A.

According to the seat air-conditioning system 100, as shown in FIGS. 13 to 15, it is possible to supply the conditioned air produced by the one seat air-conditioning device 1 to the suction port 11 of the blower 7 in the other seat air-conditioning device 1 via the coordinating flow path 65. In the seat air-conditioning device 1, the air supplied to the suction port 11 is conditioned by the operations of the blower 7 and the refrigeration circuit 2.

In other words, according to the seat air-conditioning system 100, it is possible to further adjust the temperature of the conditioned air produced by the one seat air-conditioning device 1 with the refrigeration circuit 2 of the other seat air-conditioning device 1, which enhances the air-conditioning performance for the occupant sitting in the seat 70.

According to the seat air-conditioning system 100, the operations of the one and the other seat air-conditioning devices 1 are performed individually and can be performed in the different modes and therefore it is possible to achieve various kinds of air conditioning for the occupant sitting in the seat 70 to thereby increase the comfort of the occupant.

As shown in FIG. 13, according to the seat air-conditioning system 100, by performing the coordination control in the two-stage cooling mode, it is possible to supply the cold air C produced by the seat air-conditioning device 1B to the seat air-conditioning device 1A through the suction port 11A to further cool the cold air C with the seat air-conditioning device 1A and then to supply the cold air C to the occupant in the seat 70A. In other words, with the seat air-conditioning system 100, it is possible to cool the seat 70 by using the cold air C cooled in staged by the seat air-conditioning device 1A and the seat air-conditioning device 1B to thereby increase the comfort of the occupant in the seat 70A.

As shown in FIG. 14, according to the seat air-conditioning system 100, by performing the coordination control in the two-stage heating mode, it is possible to supply the warm air W produced by the seat air-conditioning device 1B to the seat air-conditioning device 1A through the suction port 11A to further heat the warm air W with the seat air-conditioning device 1A and then to supply the warm air W to the occupant in the seat 70A. In other words, with the seat air-conditioning system 100, it is possible to heat the seat 70 by using the warm air W heated in staged by the seat air-conditioning device 1A and the seat air-conditioning device 1B to thereby increase the comfort of the occupant in the seat 70A.

As shown in FIG. 15, according to the seat air-conditioning system 100, by performing the coordination control in the dehumidification heating mode, it is possible to supply the cold air C produced by the seat air-conditioning device 1B to the seat air-conditioning device 1A through the suction port 11A to heat the cold air C with the seat air-conditioning device 1A and then to supply the air to the occupant in the seat 70A. In other words, according to the seat air-conditioning system 100, it is possible to provide the dehumidification heating to the seat 70A by effectively using the seat air-conditioning device 1B in addition to the seat air-conditioning device 1A to thereby increase the comfort of the occupant in the seat 70A.

Other Embodiments

Although the present disclose has been described above based on the embodiment, the present disclosure is not restricted to the above-described embodiment at all. In other words, various modifications can be made without departing from the gist of the present disclosure. For example, the above-described respective embodiments may be combined with each other if necessary. The above-described embodiment can be modified in the following various ways, for example.

(1) Although the seat air-conditioning device 1A disposed at the seat 70A corresponding to the driver's seat and the seat air-conditioning device 1B disposed at the seat 70B corresponding to the passenger's seat are taken as examples of the plurality of seat air-conditioning devices 1 forming the seat air-conditioning system 100 in the above-described embodiment, the plurality of seat-air conditioning devices 1 are not restricted to the examples.

The seat air-conditioning devices forming the seat air-conditioning system according to the present disclosure do not limit the disposition of the seats in the vehicle interior if the seat air-conditioning devices are disposed at the plurality of seats disposed in the vehicle interior. For example, the seat air-conditioning devices may be applied to a seat corresponding to a front seat and a seat corresponding to a rear seat or may be applied to one seat corresponding to a rear seat and the other seat corresponding to a rear seat.

Although the example in which the two seat air-conditioning devices are used is described in the above-described embodiment in order to facilitate understanding of the description, the present disclosure is not restricted to this example. The seat air-conditioning system according to the present disclosure may be formed by three or more seat air-conditioning devices.

(2) Although air conditioning of the seat 70A corresponding to the driver's seat is performed by use of the seat air-conditioning device 1A and the seat air-conditioning device 1B as an example of the coordination control in the above-described embodiment, the present disclosure is not restricted to this example. In other words, according to the seat air-conditioning system 100 of the present disclosure, air conditioning of the seat 70B corresponding to the passenger's seat may be performed by use of the seat air-conditioning device 1A and the seat air-conditioning device 1B.

(3) Although the servomotor and the door member are disposed at each of the switching portions 41 to 47 in the blowing switching portion 30 of each of the seat air-conditioning devices 1 in the above-described embodiment, the present disclosure is not restricted to this example. The door members of the respective switching portions in the blowing switching portions 30 may be opened and closed by transmission of drive forces of fewer servomotors than the respective switching portions with link mechanisms or the like. The door member in each of the switching portions may be formed by a plate-shaped member or a film-shaped member.

(4) Although each of the blowing switching portions 30 in the above-described embodiment includes the flow paths from the warm air supply flow path 31 to the suction port supply flow path 37, the switching portions 41 to 47, the warm air exhausting portion 48, and the cold air exhausting portion 49, the present disclosure is not restricted to this example. Each of the blowing switching portions in the present disclosure only needs to be able to switch the supply destination of the conditioned air to the coordinating flow path and the number and the disposition of flow paths and switching portions may be changed depending on a required mode or the like of the coordination control.

(5) Although the cold air C produced by the seat air-conditioning device 1B is supplied from the upper ducts 25A of the seat 70A and the warm air W produced by the seat air-conditioning device 1A is supplied from the lower duct 27A and the like of the seat 70A as shown in FIG. 12 in the head-cool feet-warm mode in the above-described embodiment, the present disclosure is not restricted to this example. In other words, the cold air C produced by the seat air-conditioning device 1A may be supplied from the upper ducts 25A of the seat 70A and the warm air W produced by the seat air-conditioning device 1B may be supplied from the lower duct 27A and the like of the seat 70A.

In other words, it is possible to achieve the head-cool feet-warm mode in the seat air-conditioning system according to the present disclosure by having the two structures: the structure with which the warm air or the cold air is supplied from one of the plurality of seat air-conditioning devices forming the seat air-conditioning system and the cold air or the warm air is supplied from the other of the seat air-conditioning devices to the seat to be air-conditioned in the head-cool feet-warm mode; and the structure with which the supplied cold air is blown out of the upper blow outlets of the seat to be air-conditioned in the head-cool feet-warm mode and the supplied warm air is blown out of the lower blow outlet of the seat.

(6) Although the seat air-conditioning system 100 is applied to the electric car in the above-described embodiment, the present disclosure is not restricted to this example. The seat air-conditioning system according to the present disclosure only needs to be applied to a vehicle having a plurality of seats in a vehicle interior and may be applied to a vehicle other than the electric car.

The invention claimed is:

1. A seat air-conditioning system comprising:
a plurality of seat air-conditioning devices that are disposed at a plurality of seats, respectively, in a vehicle interior, each of the plurality of seat air-conditioning devices supplying a conditioned air to a respective one of the plurality of seats; and
a controller that is configured to control operations of the plurality of seat air-conditioning devices, wherein
each of the seat air-conditioning devices includes:
a blower;
a refrigeration circuit that adjusts a temperature of blown air blown by the blower to produce the conditioned air; and
a blowing switching portion that switches a supply destination for the conditioned air adjusted by the refrigeration circuit,
the seat air-conditioning system further comprises a coordinating flow path that fluidly connects the blowing switching portion in one seat air-conditioning device for one seat to the blowing switching portion in another seat air-conditioning device for another seat, and
the controller is further configured to:
switch the supply destination for the conditioned air at the blowing switching portion in the one seat air-conditioning device to the coordinating flow path;
supply the conditioned air that have flowed through the coordinating flow path to the other seat through the blowing switching portion in the other seat air-conditioning device;
switch the supply destination for cold air cooled by the refrigeration circuit of the one seat air-conditioning device to the coordinating flow path;
supply the air to the other seat through the blowing switching portion of the other seat air-conditioning device; and
supply cold air cooled by the refrigeration circuit of the other seat air-conditioning device to the other seat through the blowing switching portion of the other seat air-conditioning device.

2. The seat air-conditioning system according to claim 1, wherein
the controller is further configured to:
switch the supply destination for warm air heated by the refrigeration circuit of the one seat air-conditioning device to the coordinating flow path;
supply the air to the other seat through the blowing switching portion of the other seat air-conditioning device; and
supply warm air heated by the refrigeration circuit of the other seat air-conditioning device to the other seat through the blowing switching portion of the other seat air-conditioning device.

3. The seat air-conditioning system according to claim 1, wherein
the controller is further configured to switch between a self-heating state and a defrosting state,
during the self-heating state, the warm air heated by the refrigeration circuit of the other seat air-conditioning device is supplied to the other seat through the blowing switching portion of the other seat air-conditioning device, and
during the defrosting state, an operation of the refrigeration circuit of the other seat air-conditioning device is stopped, the supply destination for the warm air heated by the refrigeration circuit of the one seat air-conditioning device is switched to the coordinating flow path, and the air is supplied to the other seat through the blowing switching portion of the other seat air-conditioning device.

4. The seat air-conditioning system according to claim 1, wherein
each of the plurality of blowing switching portions includes, as the supply destinations for the conditioned air, an upper blow outlet disposed at an upper portion of each of the plurality of seats and a lower blow outlet disposed at a seat face of each of the plurality of seats,
the controller is further configured to:
switch the supply destination for the cold air adjusted by the refrigeration circuit of the one seat air-conditioning device to the coordinating flow path and supply the air through the upper blow outlet of the other seat through the blowing switching portion of the other seat air-conditioning device; and
supply the warm air adjusted by the refrigeration circuit of the other seat air-conditioning device through the lower blow outlet of the other seat through the blowing switching portion of the other seat air-conditioning device.

5. The seat air-conditioning system according to claim 1, wherein
the controller is further configured to:
switch the supply destination for the conditioned air in the blowing switching portion of the one seat air-conditioning device to the coordinating flow path; and
supply the conditioned air that has flowed through the coordinating flow path to a suction port of the blower in the other seat air-conditioning device through the blowing switching portion of the other seat air-conditioning device.

6. A seat air-conditioning system comprising:
a plurality of seat air-conditioning devices that are disposed at a plurality of seats, respectively, in a vehicle interior, each of the plurality of seat air-conditioning devices supplying conditioned air to a respective one of the plurality of seats; and
a controller that is configured to control operations of the plurality of seat air-conditioning devices, wherein
each of the plurality of seat air-conditioning devices includes:
a blower;
a refrigeration circuit that adjusts a temperature of blown air blown by the blower to produce the conditioned air; and
a blowing switching portion that switches a supply destination for the conditioned air adjusted by the refrigeration circuit, the seat air-conditioning system further comprises a coordinating flow path that fluidly connects the blowing switching portion in one seat air-conditioning device for one seat to the blowing switching portion in another seat air-conditioning device for another seat, and
the controller is further configured to:
switch the supply destination for the conditioned air at the blowing switching portion in the one seat air-conditioning device to the coordinating flow path;
supply the conditioned air that has flowed through the coordinating flow path to a suction port of the blower in the other seat air-conditioning device through the blowing switching portion in the other seat air-conditioning device;
switch the supply destination for cold air adjusted by the refrigeration circuit of the one seat air-conditioning device to the coordinating flow path;
supply the cold air that has flowed through the coordinating flow path to the suction port of the blower in the other seat air-conditioning device through the blowing switching portion of the other seat air-conditioning device;
cools the cold air blown by the blower of the other seat air-conditioning device by the refrigeration circuit of the other seat air-conditioning device; and
supply the air to the other seat through the blowing switching portion.

7. The seat air-conditioning system according to claim 6, wherein
the controller is further configured to:
switch the supply destination for warm air adjusted by the refrigeration circuit of the one seat air-conditioning device to the coordinating flow path;
supply the warm air that has flowed through the coordinating flow path to the suction port of the blower in the other seat air-conditioning device through the blowing switching portion of the other seat air-conditioning device;
heat the warm air blown by the blower of the other seat air-conditioning device by the refrigeration circuit of the other seat air-conditioning device; and
supply the air to the other seat through the blowing switching portion.

8. The seat air-conditioning system according to claim 6, wherein
the controller is further configured to:
switch the supply destination for the cold air adjusted by the refrigeration circuit of the one seat air-conditioning device to the coordinating flow path;
supply the cold air that has flowed through the coordinating flow path to the suction port of the blower in the other seat air-conditioning device through the blowing switching portion of the other seat air-conditioning device;
heat the cold air blown by the blower of the other seat air-conditioning device by the refrigeration circuit of the other seat air-conditioning device; and
supply the air to the other seat through the blowing switching portion.

9. A seat air-conditioning system comprising:
a plurality of seat air-conditioning devices that are disposed at a plurality of seats, respectively, in a vehicle interior, each of the plurality of seat air-conditioning devices supplying a conditioned air to a respective one of the plurality of seats; and
a processor that is programmed to control operations of the plurality of seat air-conditioning devices, wherein each of the seat air-conditioning devices includes:
  a blower;
  a refrigeration circuit that adjusts a temperature of blown air blown by the blower to produce the conditioned air; and
  a blowing switching portion that switches a supply destination for the conditioned air adjusted by the refrigeration circuit,
the seat air-conditioning system further comprises a coordinating flow path that fluidly connects the blowing switching portion in one seat air-conditioning device for one seat to the blowing switching portion in another seat air-conditioning device for another seat, and
the processor is further programmed to:
  switch the supply destination for the conditioned air at the blowing switching portion in the one seat air-conditioning device to the coordinating flow path; and
  supply the conditioned air that have flowed through the coordinating flow path to the other seat through the blowing switching portion in the other seat air-conditioning device;
  switch the supply destination for cold air cooled by the refrigeration circuit of the one seat air-conditioning device to the coordinating flow path;
  supply the air to the other seat through the blowing switching portion of the other seat air-conditioning device; and
  supply cold air cooled by the refrigeration circuit of the other seat air-conditioning device to the other seat through the blowing switching portion of the other seat air-conditioning device.

10. The seat air-conditioning system according to claim 9, wherein
the processor is further programmed to:
  switch the supply destination for warm air heated by the refrigeration circuit of the one seat air-conditioning device to the coordinating flow path;
  supply the air to the other seat through the blowing switching portion of the other seat air-conditioning device; and
  supply warm air heated by the refrigeration circuit of the other seat air-conditioning device to the other seat through the blowing switching portion of the other seat air-conditioning device.

11. The seat air-conditioning system according to claim 9, wherein
the processor is further programmed to switch between a self-heating state and a defrosting state,
during the self-heating state, the warm air heated by the refrigeration circuit of the other seat air-conditioning device is supplied to the other seat through the blowing switching portion of the other seat air-conditioning device, and
during the defrosting state, an operation of the refrigeration circuit of the other seat air-conditioning device is stopped, the supply destination for the warm air heated by the refrigeration circuit of the one seat air-conditioning device is switched to the coordinating flow path, and the air is supplied to the other seat through the blowing switching portion of the other seat air-conditioning device.

12. The seat air-conditioning system according to claim 9, wherein
each of the plurality of blowing switching portions includes, as the supply destinations for the conditioned air, an upper blow outlet disposed at an upper portion of each of the plurality of seats and a lower blow outlet disposed at a seat face of each of the plurality of seats,
the processor is further programmed to:
  switch the supply destination for the cold air adjusted by the refrigeration circuit of the one seat air-conditioning device to the coordinating flow path and supply the air through the upper blow outlet of the other seat through the blowing switching portion of the other seat air-conditioning device; and
  supply the warm air adjusted by the refrigeration circuit of the other seat air-conditioning device through the lower blow outlet of the other seat through the blowing switching portion of the other seat air-conditioning device.

13. The seat air-conditioning system according to claim 9, wherein
the processor is further programmed to:
  switch the supply destination for the conditioned air in the blowing switching portion of the one seat air-conditioning device to the coordinating flow path; and
  supply the conditioned air that has flowed through the coordinating flow path to a suction port of the blower in the other seat air-conditioning device through the blowing switching portion of the other seat air-conditioning device.

\* \* \* \* \*